US009565011B2

(12) United States Patent
Palanki et al.

(10) Patent No.: US 9,565,011 B2
(45) Date of Patent: Feb. 7, 2017

(54) DATA TRANSMISSION WITH CROSS-SUBFRAME CONTROL IN A WIRELESS NETWORK

(75) Inventors: Ravi Palanki, San Diego, CA (US); Aamod Dinkar Khandekar, San Diego, CA (US); Kapil Bhattad, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 447 days.

(21) Appl. No.: 12/792,121

(22) Filed: Jun. 2, 2010

(65) Prior Publication Data

US 2010/0309867 A1     Dec. 9, 2010

Related U.S. Application Data

(60) Provisional application No. 61/184,218, filed on Jun. 4, 2009, provisional application No. 61/184,224, filed on Jun. 4, 2009.

(51) Int. Cl.
*H04L 5/00* (2006.01)

(52) U.S. Cl.
CPC ........... *H04L 5/0091* (2013.01); *H04L 5/0053* (2013.01); *H04L 5/0055* (2013.01)

(58) Field of Classification Search
CPC ..... H04L 5/0053; H04L 5/0055; H04L 5/0091
USPC ........................................................ 370/329
See application file for complete search history.

(56) References Cited

U.S. PATENT DOCUMENTS 8,144,658 B2    3/2012 Damnjanovic et al.
8,295,243 B2    10/2012 Malladi et al.

| 2002/0191555 | A1 | 12/2002 | Borst et al. |
| 2003/0114195 | A1 | 6/2003 | Chitrapu et al. |
| 2004/0100921 | A1* | 5/2004 | Khan ............................ 370/321 |

(Continued)

FOREIGN PATENT DOCUMENTS

| CN | 1689260 A | 10/2005 |
| EP | 0684744 A2 | 11/1995 |

(Continued)

OTHER PUBLICATIONS

International Search Report and Written Opinion—PCT/US2010/037534—ISA/EPO—May 23, 2011.

(Continued)

*Primary Examiner* — Stephen J Clawson
(74) *Attorney, Agent, or Firm* — Nerrie M. Zohn

(57) ABSTRACT

Techniques for supporting communication in dominant interference scenarios are described. In an aspect, communication in a dominant interference scenario may be supported with cross-subframe control. Different base stations may be allocated different subframes for sending control information. Each base station may send control messages in the subframes allocated to that base station. Different base stations may have different timelines for sending control messages due to their different allocated subframes. With cross-subframe control, control information (e.g., grants, acknowledgement, etc.) may be sent in a first subframe and may be applicable for data transmission in a second subframe, which may be a variable number of subframes from the first subframe. In another aspect, messages to mitigate interference may be sent on a physical downlink control channel (PDCCH).

40 Claims, 13 Drawing Sheets

(56) References Cited

U.S. PATENT DOCUMENTS

| | | |
|---|---|---|
| 2004/0152480 A1 | 8/2004 | Willars et al. |
| 2005/0009527 A1 | 1/2005 | Sharma |
| 2005/0047344 A1* | 3/2005 | Seol ............................ 370/235 |
| 2006/0009210 A1 | 1/2006 | Rinne et al. |
| 2006/0092869 A1* | 5/2006 | Herrmann .................... 370/314 |
| 2007/0105575 A1 | 5/2007 | Sampath et al. |
| 2007/0243874 A1* | 10/2007 | Park et al. ................... 455/442 |
| 2008/0101211 A1 | 5/2008 | Rao |
| 2008/0212543 A1 | 9/2008 | Ban |
| 2008/0232307 A1 | 9/2008 | Pi et al. |
| 2008/0240304 A1 | 10/2008 | Oh et al. |
| 2009/0069043 A1* | 3/2009 | Roh et al. .................... 455/522 |
| 2009/0092103 A1* | 4/2009 | Rao ............................. 370/336 |
| 2009/0181687 A1 | 7/2009 | Tiirola et al. |
| 2009/0191874 A1 | 7/2009 | Du et al. |
| 2009/0196249 A1 | 8/2009 | Kawamura et al. |
| 2009/0204863 A1 | 8/2009 | Kim et al. |
| 2009/0219853 A1 | 9/2009 | Hart et al. |
| 2009/0225883 A1* | 9/2009 | Orlik et al. ................... 375/260 |
| 2009/0298493 A1 | 12/2009 | Lin |
| 2009/0325590 A1 | 12/2009 | Liu et al. |
| 2010/0309876 A1 | 12/2010 | Khandekar et al. |
| 2012/0300738 A1 | 11/2012 | Palanki et al. |

FOREIGN PATENT DOCUMENTS

| | | |
|---|---|---|
| JP | 2007517431 A | 6/2007 |
| JP | 2010516164 A | 5/2010 |
| JP | 2010537545 A | 12/2010 |
| JP | 2011504062 | 1/2011 |
| KR | 20080086857 A | 9/2008 |
| KR | 20080092222 A | 10/2008 |
| KR | 20090037387 A | 4/2009 |
| RU | 2154901 | 8/2000 |
| RU | 2207723 C1 | 6/2003 |
| TW | 496045 B | 7/2002 |
| TW | 200731716 | 8/2007 |
| WO | WO-2005060145 A1 | 6/2005 |
| WO | WO-2006086788 A1 | 8/2006 |
| WO | WO2007078171 A2 | 7/2007 |
| WO | WO2008009027 | 1/2008 |
| WO | 2008024788 A2 | 2/2008 |
| WO | WO2008127015 | 10/2008 |
| WO | 2009025492 A1 | 2/2009 |
| WO | WO2009052754 A1 | 4/2009 |
| WO | WO2009065075 A1 | 5/2009 |

OTHER PUBLICATIONS

European Search Report—EP12168802—Search Authority—The Hague—Jun. 4, 2012.
Taiwan Search Report—TW099118213—TIPO—Jan. 4, 2013.

* cited by examiner

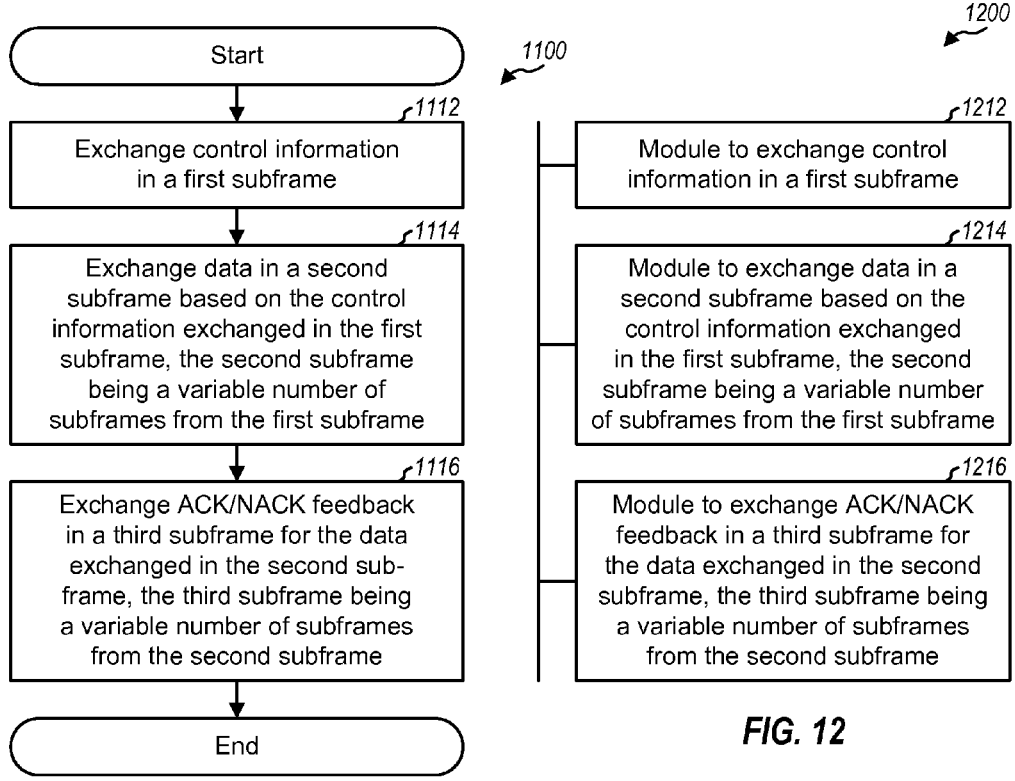
FIG. 11
FIG. 12
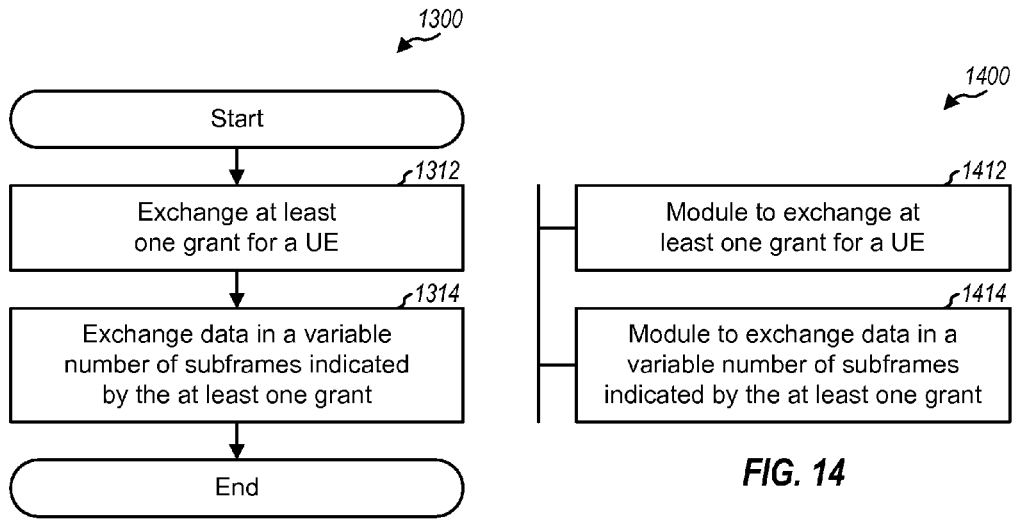
FIG. 13
FIG. 14

DATA TRANSMISSION WITH CROSS-SUBFRAME CONTROL IN A WIRELESS NETWORK

The present application claims priority to provisional U.S. Application Ser. No. 61/184,218, entitled "SYSTEMS AND METHODS OF SUPPORTING RESTRICTED ASSOCIATION/RANGE EXTENSION IN HETEROGENEOUS NETWORKS VIA CROSS SUBFRAME CONTROL," and Application Ser. No. 61/184,224, entitled "TRANSMITTING RESOURCE UTILIZATION MESSAGES ON THE PHYSICAL DOWNLINK CONTROL CHANNEL," both filed Jun. 4, 2009, assigned to the assignee hereof, and incorporated herein by reference.

BACKGROUND

I. Field

The present disclosure relates generally to communication, and more specifically to techniques for supporting data transmission in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data to one or more UEs on the downlink and may receive data from one or more UEs on the uplink. On the downlink, data transmission from the base station may observe interference due to data transmissions from neighbor base stations. On the uplink, data transmission from each UE may observe interference due to data transmissions from other UEs communicating with the neighbor base stations. For both the downlink and uplink, the interference due to the interfering base stations and interfering UEs may degrade performance.

SUMMARY

Techniques for supporting communication in dominant interference scenarios are described herein. A dominant interference scenario is a scenario in which a UE or a base station observes high interference, which may severely degrade data transmission performance.

In an aspect, communication in a dominant interference scenario may be supported with cross-subframe control. Different base stations may be allocated different subframes for sending control information. Each base station may send control messages in the subframes allocated to that base station. Different base stations may have different timelines for sending control messages due to their different allocated subframes. With cross-subframe control, control information (e.g., grants, acknowledgement, etc.) may be sent in a first subframe and may be applicable for data transmission in a second subframe, which may be a variable number of subframes from the first subframe.

In one design, control information may be exchanged (e.g., sent or received) in a first subframe. Data may be exchanged in a second subframe based on the control information exchanged in the first subframe. The second subframe may be a variable number of subframes from the first subframe. Acknowledgement may be exchanged in a third subframe for the data exchanged in the second subframe. The third subframe may also be a variable number of subframes from the second subframe.

In another aspect, messages to mitigate interference may be sent on a physical downlink control channel (PDCCH). In one design, a base station may send a message on the PDCCH to request for reduced interference. The base station may thereafter exchange (e.g., send or receive) data on resources having reduced interference due to the message sent on the PDCCH. In one design, a UE may monitor for messages sent by at least one base station on the PDCCH to request for reduced interference. The UE may exchange data on resources having reduced interference due to the messages sent by the at least one base station on the PDCCH.

Various aspects and features of the disclosure are described in further detail below.

BRIEF DESCRIPTION OF THE DRAWINGS

FIGS. 11 and 12 show a process and an apparatus, respectively, for exchanging data with cross-subframe control.

FIGS. 13 and 14 show a process and an apparatus, respectively, for sending at least one grant for data transmission in a variable number of subframes.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
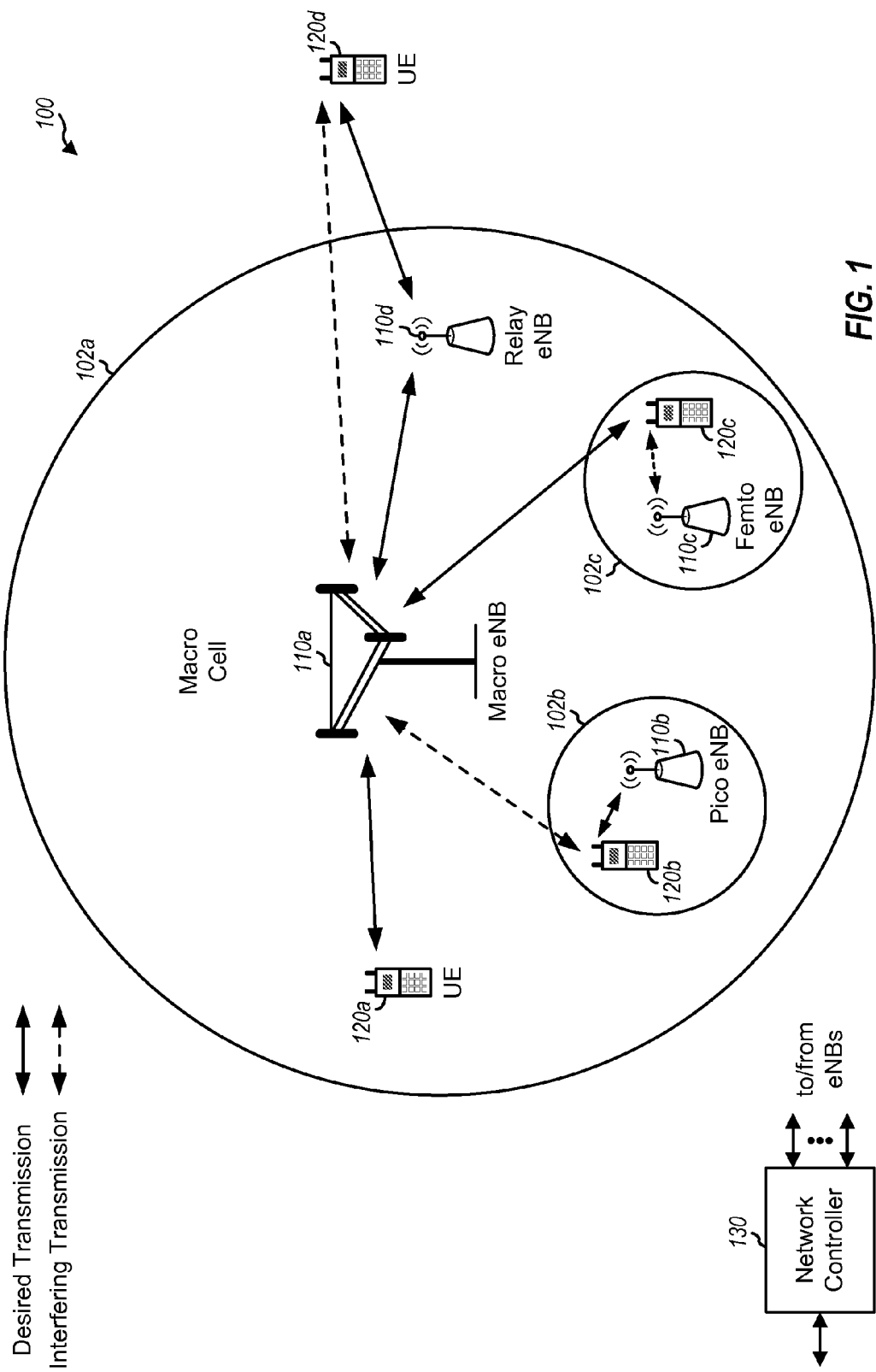
FIG. 1 shows a wireless communication network.

FIG. 1 shows a wireless communication network 100, which may be an LTE network or some other wireless network. Wireless network 100 may include a number of evolved Node Bs (eNBs) 110 and other network entities. An eNB may be an entity that communicates with the UEs and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station", and "cell" may be used interchangeably herein.

Wireless network 100 may also include relay stations. A relay station may be an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with a UE 120d via an access link and with macro eNB 110a via a backhaul link in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may be able to communicate with macro eNBs, pico eNBs, femto eNBs, relay eNBs, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

Figure 2:
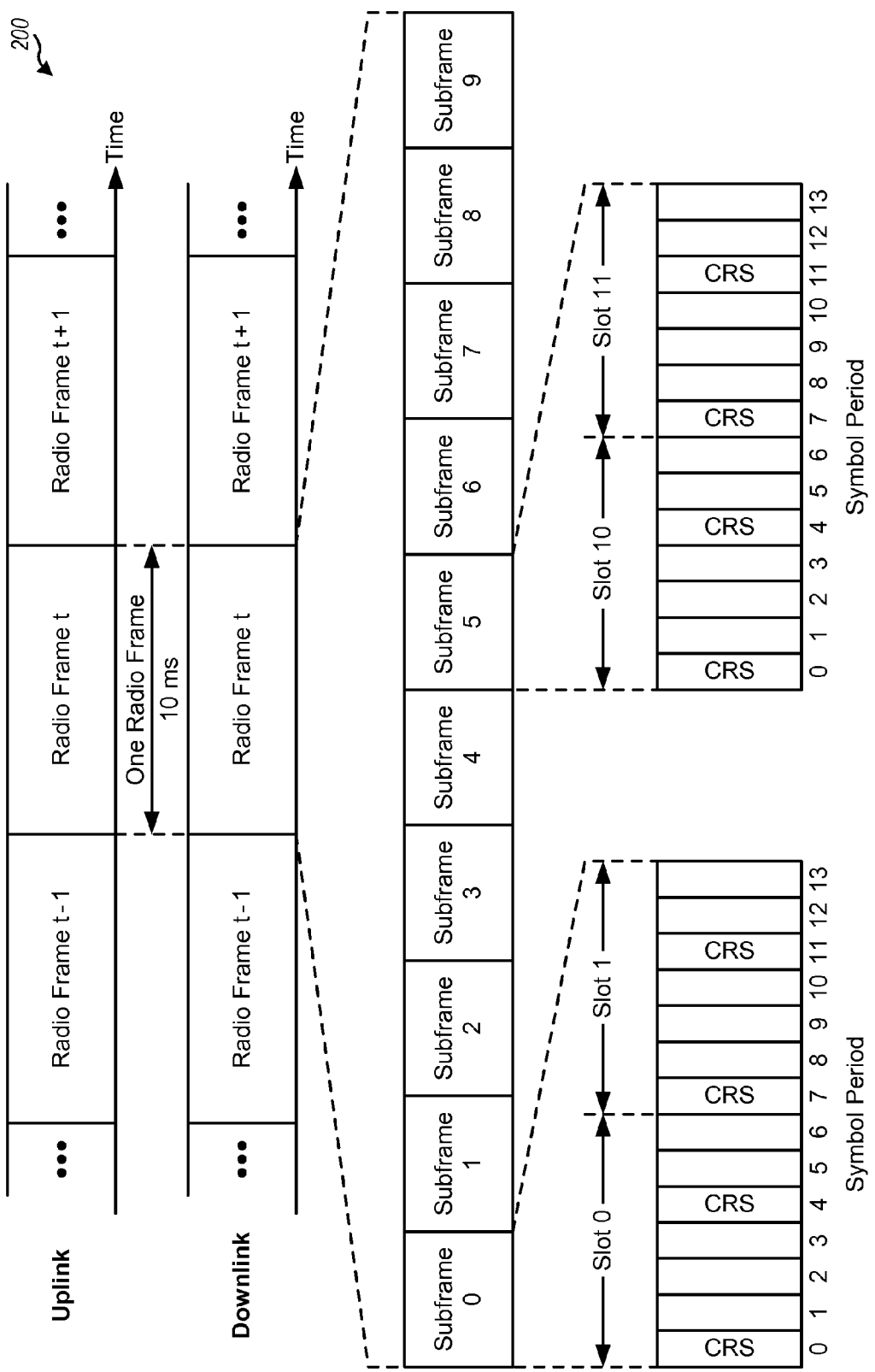
FIG. 2 shows an exemplary frame structure.

FIG. 2 shows an exemplary frame structure 200 for frequency division duplexing (FDD) in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, $N_{FFT}$ may be equal to 128, 256, 512, 1024 or 2048 for system bandwidth of 1.25, 2.5, 5, 10 or 20 megahertz (MHz), respectively. The system bandwidth may also be partitioned into a number of subbands, and each subband may cover a range of frequencies, e.g., 1.08 MHz.

The available time frequency resources for each of the downlink and uplink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Figure 3:
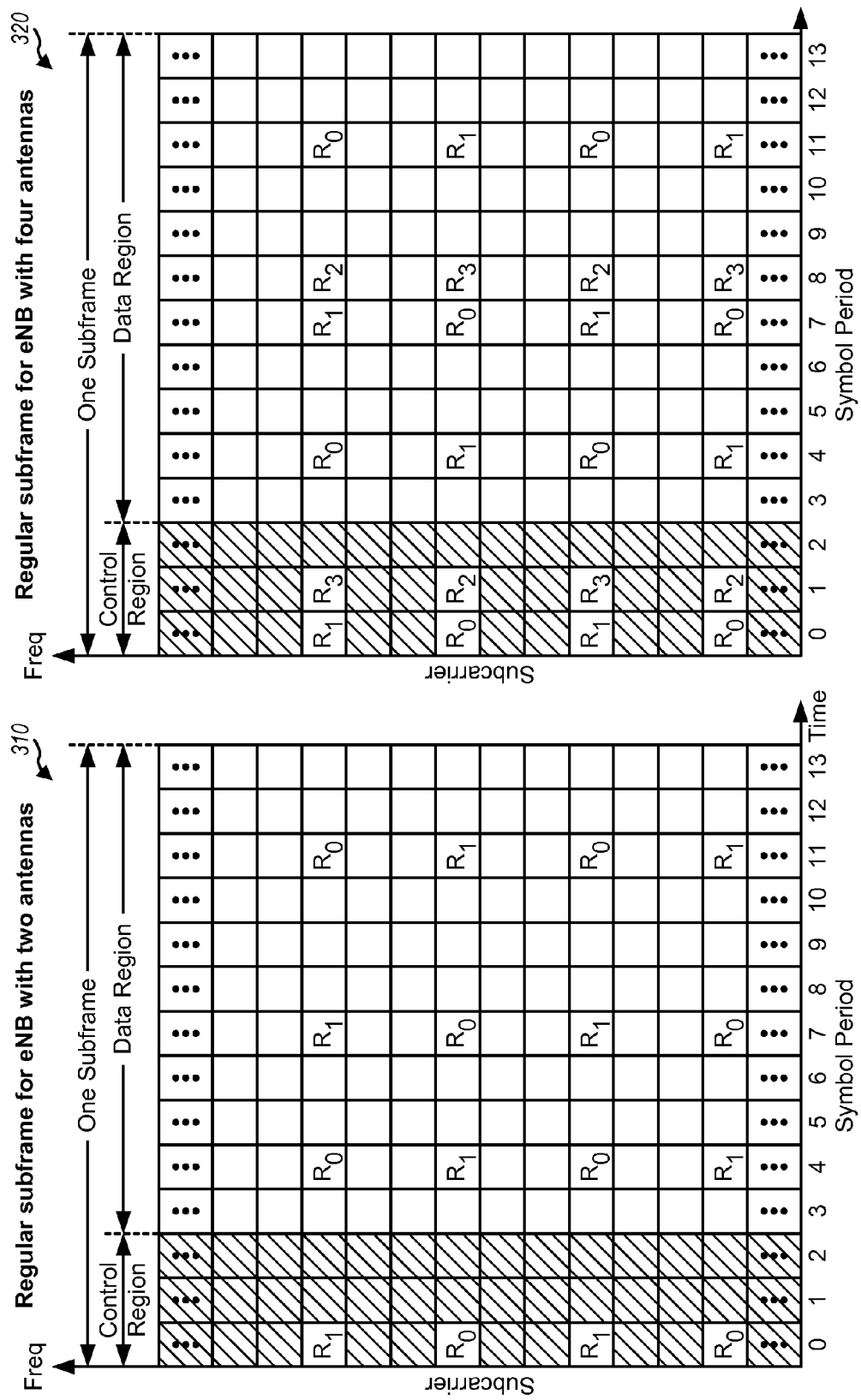
FIG. 3 shows two exemplary subframe formats for the downlink.

FIG. 3 shows two exemplary subframe formats 310 and 320 for the downlink with the normal cyclic prefix in LTE. A subframe for the downlink may include a control region followed by a data region, which may be time division multiplexed. The control region may include the first M symbol periods of the subframe, where M may be equal to 1, 2, 3 or 4. M may change from subframe to subframe and may be conveyed in the first symbol period of the subframe. The control region may carry control information, e.g., control messages. The data region may include the remaining 2L−M symbol periods of the subframe and may carry data and/or other information.

In LTE, an eNB may transmit a physical control format indicator channel (PCFICH), a physical hybrid ARQ indicator channel (PHICH), and a physical downlink control channel (PDCCH) in the control region of a subframe. The PCFICH may convey the size of the control region (e.g., the value of M). The PHICH may carry acknowledgement (ACK) and negative acknowledgement (NACK) feedback for data transmission sent on the uplink with hybrid automatic repeat request (HARQ). The PDCCH may carry downlink grants, uplink grants, and/or other control information. The eNB may also transmit a physical downlink shared channel (PDSCH) in the data region of a subframe. The PDSCH may carry data for UEs scheduled for data transmission on the downlink.

Subframe format 310 may be used for an eNB equipped with two antennas. A cell-specific reference signal (CRS) may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 3, for a given resource element with label $R_a$, a modulation symbol may be sent on that resource element from antenna a, and no modulation symbols may be sent on that resource element from other antennas. Subframe format 320 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 310 and 320, a CRS may be transmitted on evenly spaced subcarriers, which may be determined based on the cell ID. Different eNBs may transmit CRSs for their cells on the same or different subcarriers, depending on the cell IDs of these cells. For both subframe formats 310 and 320, resource elements not used for the CRS may be used to transmit data or control information.

Figure 4:
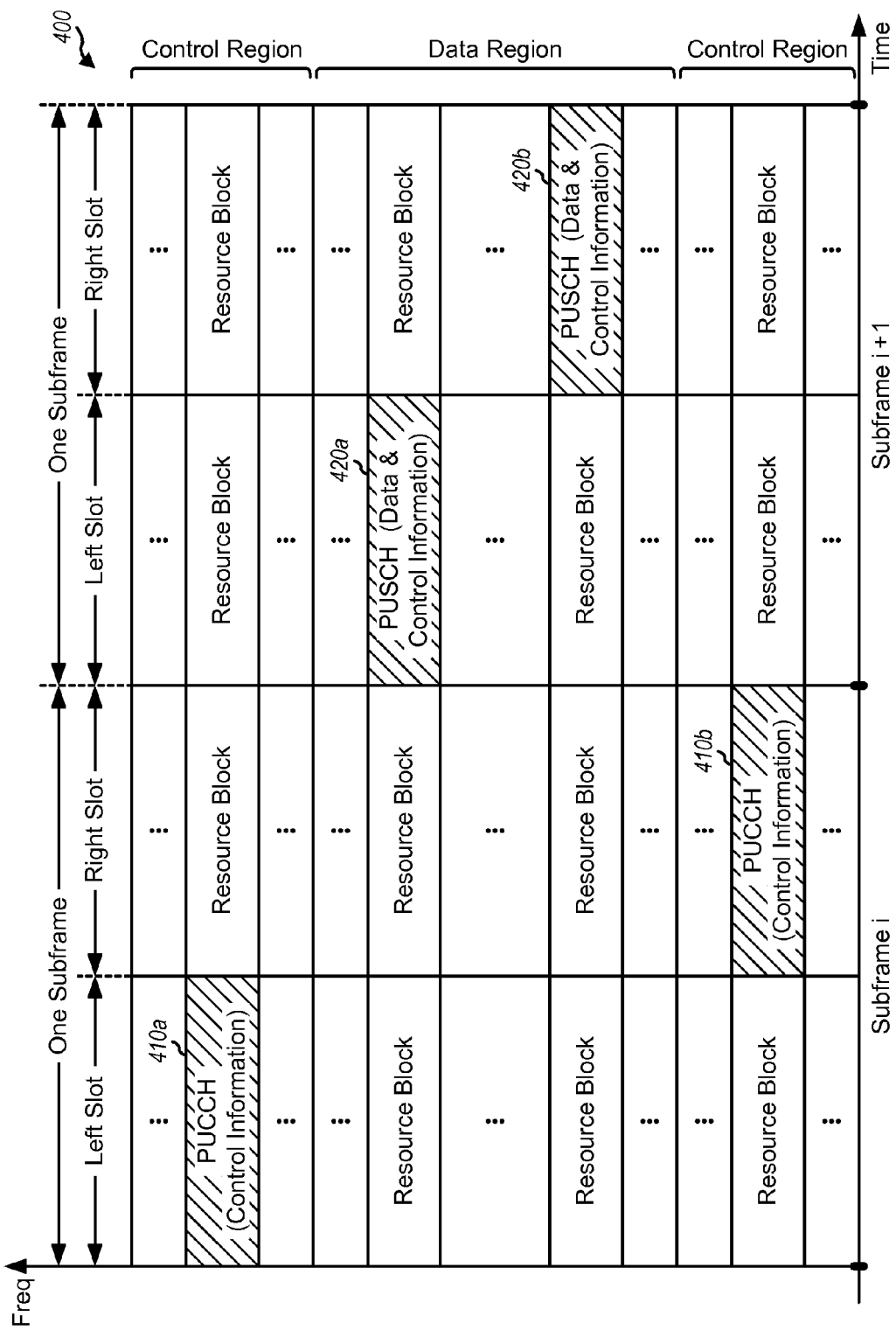
FIG. 4 shows an exemplary subframe format for the uplink.

FIG. 4 shows an exemplary subframe format 400 for the uplink in LTE. A subframe for the uplink may include a control region and a data region, which may be frequency division multiplexed. The control region may be formed at the two edges of the system bandwidth and may have a configurable size. The data region may include all resource blocks not included in the control region.

A UE may be assigned resource blocks in the control region to send control information to an eNB. The UE may also be assigned resource blocks in the data region to send data to the eNB. The UE may send control information on a physical uplink control channel (PUCCH) on assigned resource blocks 410a and 410b in the control region. The UE may send only data, or both data and control information, on a physical uplink shared channel (PUSCH) on assigned resource blocks 420a and 420b in the data region. An uplink transmission may span both slots of a subframe and may hop across frequency, as shown in FIG. 4.

The PCFICH, PDCCH, PHICH, PDSCH, PUCCH, PUSCH, and CRS in LTE are described in 3GPP TS 36.211, entitled "Evolved Universal Terrestrial Radio Access (E-UTRA); Physical Channels and Modulation," which is publicly available.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR) or some other metric.

A UE may operate in a dominant interference scenario in which the UE may observe high interference from one or more interfering eNBs. A dominant interference scenario may occur due to restricted association. For example, in FIG. 1, UE 120c may be close to femto eNB 110c and may have high received power for eNB 110c. However, UE 120c may not be able to access femto eNB 110c due to restricted association and may then connect to macro eNB 110a with lower received power. UE 120c may then observe high interference from femto eNB 110c on the downlink and may also cause high interference to femto eNB 110c on the uplink.

A dominant interference scenario may also occur due to range extension, which is a scenario in which a UE connects to an eNB with lower pathloss and possibly lower SINR than some other eNBs detected by the UE. For example, in FIG. 1, UE 120b may be located closer to pico eNB 110b than macro eNB 110a and may have lower pathloss for pico eNB 110b. However, UE 120b may have lower received power for pico eNB 110b than macro eNB 110a due to a lower transmit power level of pico eNB 110b as compared to macro eNB 110a. Nevertheless, it may be desirable for UE 120b to connect to pico eNB 110b due to the lower pathloss. Range extension may result in less interference on the uplink for a given data rate for UE 120b. Range extension may also provide cell-splitting gain on the downlink, since multiple pico eNBs can serve UEs that might otherwise be served by a macro eNB. Range extension may thus improve overall network performance.

A dominant interference scenario may also occur due to relay operation. For example, a relay eNB may have a good access link for a UE but a poor backhaul link for a donor eNB serving the relay eNB. The UE may then communicate directly with the donor eNB due to the poor backhaul link of the relay eNB. The UE may then observe high interference from the relay eNB on the downlink and may cause high interference to the relay eNB on the uplink. A dominant interference scenario may also occur when the relay eNB is used for range extension, similar to the case of range extension for a pico eNB.

In an aspect, communication in a dominant interference scenario may be supported with TDM partitioning of downlink control resources used to send control information on the downlink. For TDM partitioning, different eNBs may be allocated different time resources. Each eNB may send its control information in its allocated time resources, which may have reduced interference (e.g., no interference) from strong interfering eNBs. Each eNB may avoid sending control information (or may send control information at a lower transmit power level) in time resources allocated to other eNBs and may avoid causing high interference to the other eNBs. This may enable a UE to communicate with a weaker serving eNB in the presence of a strong interfering eNB. An eNB may be classified as "weak" or "strong" based on the received power of the eNB at a UE (and not based on the transmit power level of the eNB).

In one design, TDM partitioning of downlink control resources may be performed at subframe level. In this design, different eNBs may be allocated different sets of subframes. Each eNB may send its control information in the control region of the subframes allocated to that eNB. Each eNB may avoid sending control information (or may send control information at a lower transmit power level) in the control region of the subframes allocated to other eNBs.

Figure 5:
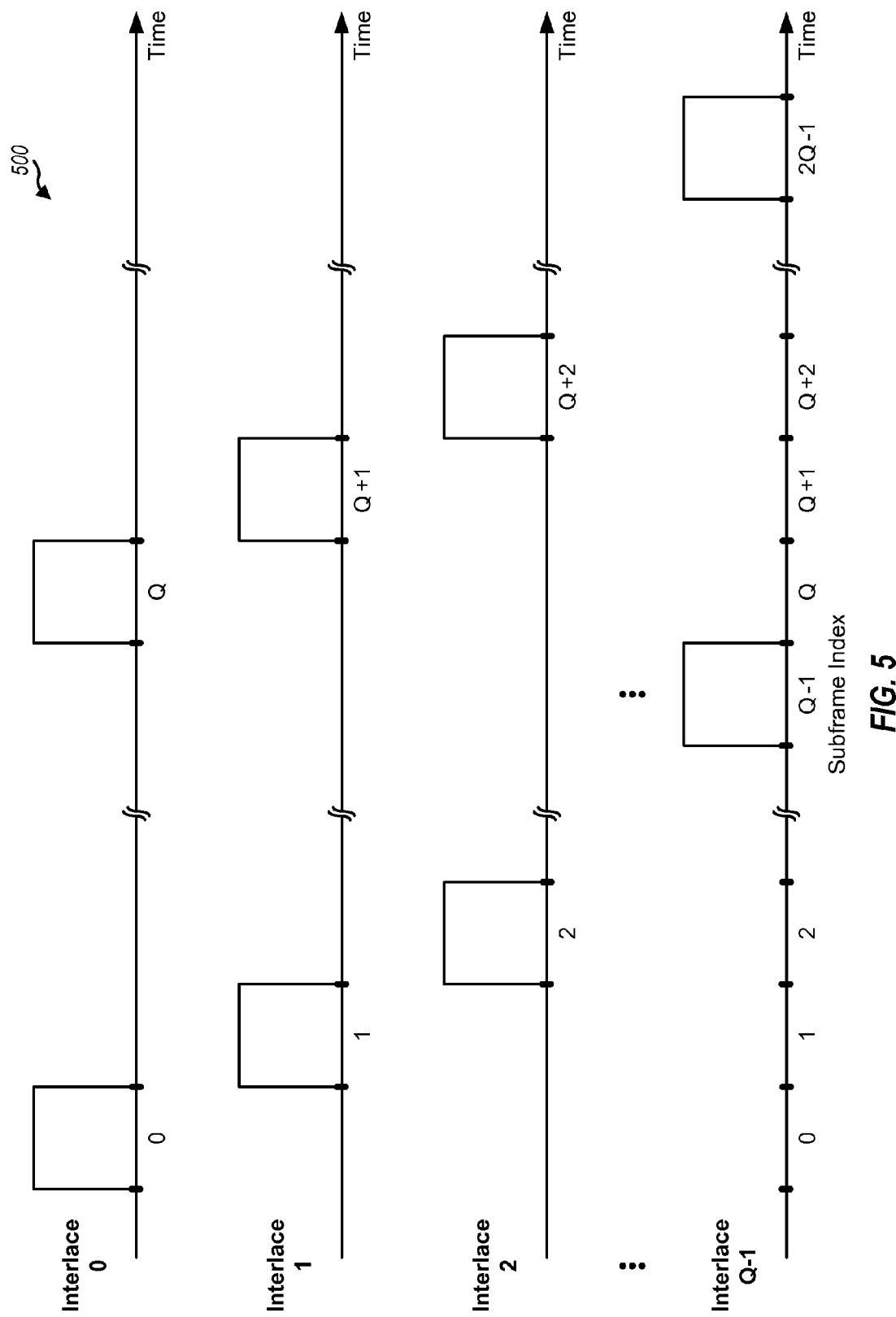
FIG. 5 shows an exemplary interlace structure.

FIG. 5 shows an exemplary interlace structure 500, which may be used for each of the downlink and uplink for FDD in LTE. As shown in FIG. 5, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

In one design, different eNBs may be allocated different interlaces. For example, eight interlaces may be defined, pico eNB 110b in FIG. 1 may be allocated two interlaces 0 and 4, and macro eNB 110a may be allocated the remaining six interlaces. Pico eNB 110b may send its control information in the control region of the subframes in interlaces 0 and 4 and may avoid sending control information in the control region of the subframes in the other six interlaces. Conversely, macro eNB 110a may send its control information in the control region of the subframes in interlaces 1, 2, 3, 5, 6 and 7 and may avoid sending control information in the control region of the subframes in the other two interlaces.

Different eNBs may also be allocated different sets of subframes defined in other manners. In general, the available subframes may be allocated to any number of eNBs, and each eNB may be allocated any set of subframes. Different eNBs may be allocated the same or different numbers of subframes. Each eNB may send its control information in the control region of its allocated subframes and may avoid sending control information (or send control information at a lower transmit power level) in the control regions of other subframes.

The control region of a subframe may have a configurable size of M symbol periods, as described above. Since the control region size can vary, an interfering eNB may not know the size of the control region used by a weaker eNB. In one design, the interfering eNB may assume the largest possible control region size, which may be three symbol periods for system bandwidth of 5 MHz or more in LTE. The interfering eNB may then avoid sending data or control information within the control region of the assumed size. In another design, each eNB may have a configured control region size, which may be determined via negotiation between eNBs or may be assigned by a designated network entity. An interfering eNB may then clear the control region of another eNB for a number of symbol periods determined by the configured control region size for that other eNB.

In another design, TDM partitioning of downlink control resources may be performed at symbol level. In this design, different eNBs may be allocated different symbol periods in the control region of each subframe. Each eNB may send its control information in one or more symbol periods allocated to that eNB in the control region of each subframe and may avoid sending control information in the remaining symbol periods of the control region. For example, the control region may include M=3 symbol periods, pico eNB 110b in FIG. 1 may be allocated symbol period 2 in the control region of each subframe, and macro eNB 110a may be allocated symbol periods 0 and 1. Pico eNB 110b may send its control information in symbol period 2 of each subframe and may avoid sending control information in symbol periods 0 and 1 of each subframe. Conversely, macro eNB 110a may send its control information in symbol periods 0 and 1 of each subframe and may avoid sending control information in symbol period 2 of each subframe. In general, the M symbol periods in the control region of each subframe may be allocated to up to M different eNBs. Each eNB may be allocated one or more symbol periods in the control region.

In yet another design, TDM partitioning of downlink control resources may be performed at both subframe and symbol levels. Different eNBs may be allocated different symbol periods in the control region of different subframes. For example, eight interlaces may be defined and the control region may include M=3 symbol periods. Macro eNB 110a in FIG. 1 may be allocated all three symbols in the control region of subframes in interlaces 0, 2, 4 and 6 and may be allocated symbol period 0 in the control region of each remaining subframe. Pico eNB 110b may be allocated symbol periods 1 and 2 in the control region of subframes in interlaces 1, 3, 5 and 7.

TDM partitioning of downlink control resources may also be performed in other manners, e.g., based on other units of time. In one design, different eNBs that can potentially cause high interference to one another may be pre-allocated different time resources, e.g., by a designated network entity. In another design, the eNBs may negotiate (e.g., via the backhaul) for TDM partitioning to allocate sufficient time resources to each eNB. In general, TDM partitioning may be static and not changed, or semi-static and changed infrequently (e.g., every 100 ms), or dynamic and changed as often as necessary (e.g., every subframe or every radio frame).

In another aspect, communication in a dominant interference scenario may be supported with FDM partitioning of uplink control resources used to send control information on the uplink. For FDM partitioning, different eNBs may be allocated different frequency resources. The UEs served by each eNB may send control information in the allocated frequency resources, which may have reduced interference from UEs communicating with other eNBs. This may enable each eNB to communicate with its UEs in the presence of strong interfering UEs.

Figure 6:
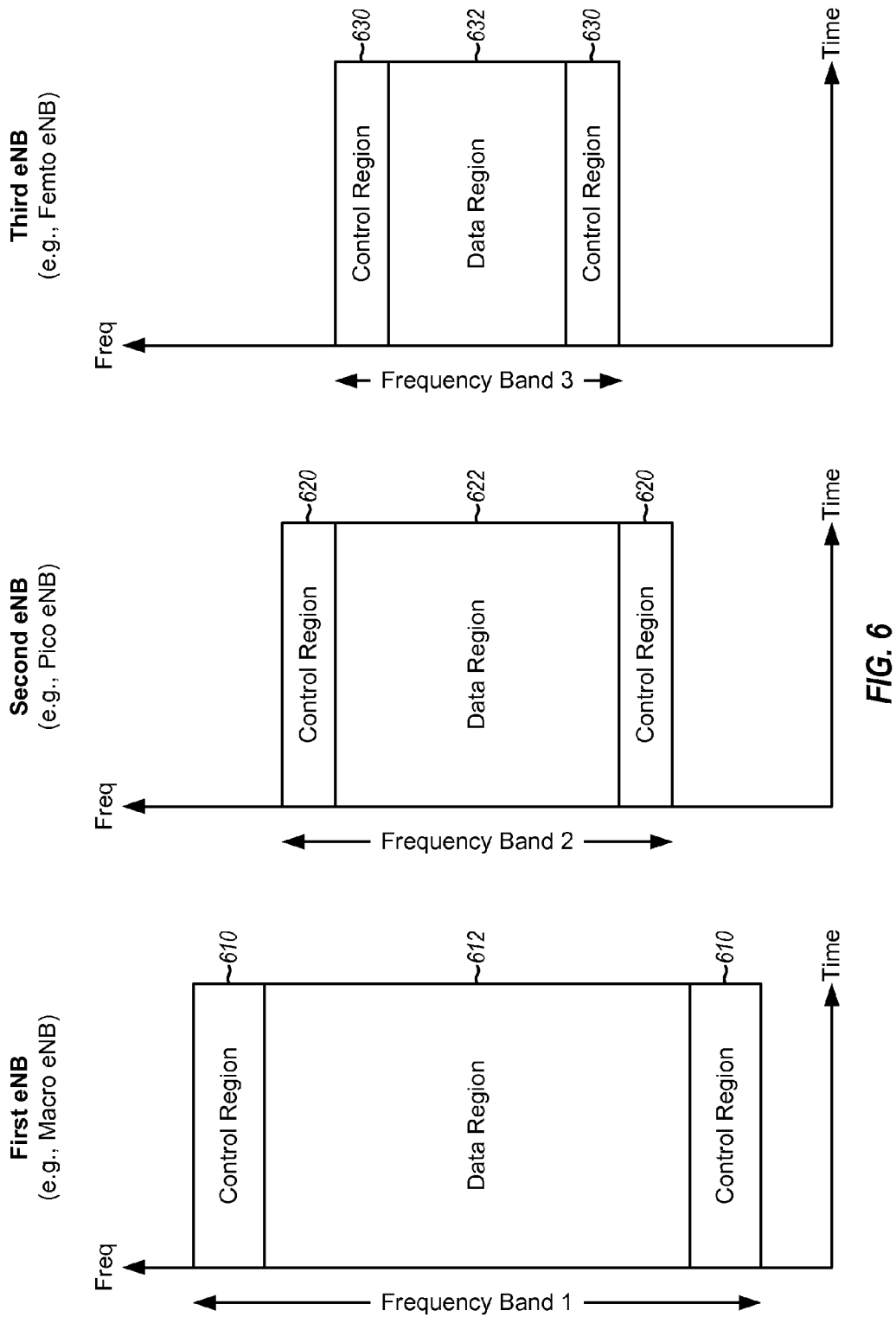
FIG. 6 shows an exemplary frequency division multiplex (FDM) partitioning for the uplink.

FIG. 6 shows a design of FDM partitioning of uplink control resources for three eNBs in a dominant interference scenario. In the example shown in FIG. 6, frequency band 1 may be used for the uplink for a first eNB (e.g., macro eNB 110a in FIG. 1) and may have a bandwidth corresponding to the system bandwidth. Frequency band 2 may be used for the uplink for a second eNB (e.g., pico eNB 110b) and may have a smaller bandwidth than frequency band 1. Frequency band 3 may be used for the uplink for a third eNB and may have a smaller bandwidth than frequency band 2.

UEs communicating with the first eNB may transmit the PUCCH in a control region 610 formed near the two edges of band 1 and may transmit the PUSCH in a data region 612 in the middle of band 1. UEs communicating with the second eNB may transmit the PUCCH in a control region 620 formed near the two edges of band 2 and may transmit the PUSCH in a data region 622 in the middle of band 2. UEs communicating with the third eNB may transmit the PUCCH in a control region 630 formed near the two edges of band 3 and may transmit the PUSCH in a data region 632 in the middle of band 3. Control regions 610, 620, and 630 may be non-overlapping as shown in FIG. 6 in order to avoid interference on uplink control information for the three eNBs. Control regions 610, 620, and 630 may be defined by different PUCCH offsets, and each PUCCH offset may indicate an outer frequency of a control region for an eNB.

FIG. 6 shows an exemplary design of FDM partitioning of uplink control resources. FDM partitioning may also be performed in other manners. For example, the frequency bands for different eNBs may have the same bandwidth but may be shifted in frequency to avoid overlapping the control regions.

It may be desirable to use TDM partitioning for downlink control resources. This may allow the eNBs to transmit the PDCCH across the entire system bandwidth and obtain frequency diversity. However, FDM partitioning may also be used for downlink control resources. It may be desirable to use FDM partitioning for uplink control resources. This may allow the UEs to transmit the PUCCH in each subframe to reduce latency. FDM partitioning may not impact the operation of the UEs since the PUCCH is typically transmitted in one or few resource blocks in each slot, as shown in FIG. 4. However, TDM partitioning may also be used for uplink control resources. For clarity, much of the description below assumes TDM partitioning for downlink control resources and FDM partitioning for uplink control resources.

Communication in a dominant interference scenario may also be supported with short-term interference mitigation. Interference mitigation may blank or reduce the transmit power of interfering transmissions so that a higher received signal quality can be achieved for a desired transmission. Interference mitigation may be short term and performed as needed, e.g., on a per subframe or packet basis.

Figure 7:
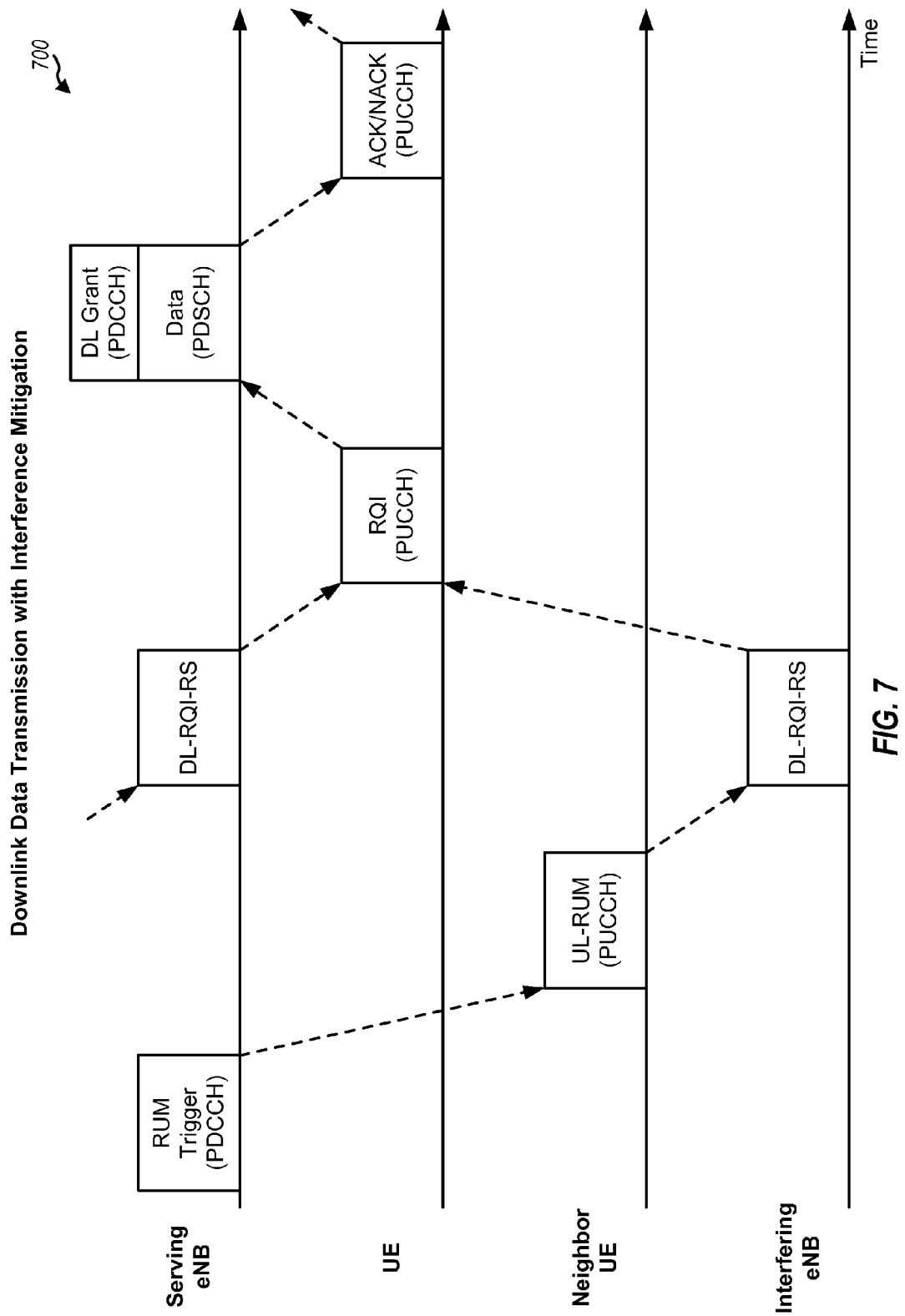
FIGS. 7 and 8 show data transmission with interference mitigation on the downlink and uplink, respectively.

FIG. 7 shows a design of a scheme 700 for downlink data transmission with interference mitigation. A serving eNB may have data to send to a UE and may have knowledge that the UE is observing high interference on the downlink. For example, the serving eNB may receive pilot measurement reports from the UE, and the reports may indicate and/or identify strong interfering eNBs. The serving eNB may send a resource utilization message (RUM) trigger on the PDCCH to the UE. The RUM trigger may also be referred to as a RUM request, an interference mitigation trigger, etc. The RUM trigger may ask a UE to request an eNB to clear or reduce interference on the downlink. The RUM trigger may convey specific data resources (e.g., a specific subband in a specific subframe) on which to reduce interference, the priority of the request, and/or other information.

The UE served by the serving eNB may receive the RUM trigger and may send an uplink RUM (UL-RUM) to an interfering eNB. The interfering eNB may receive other UL-RUMs from other UEs observing high interference from the interfering eNB. A UL-RUM may also be referred to as a reduce interference request. A UL-RUM may ask the interfering eNB to reduce interference on the specified data resources and may also convey the priority of the request, a target interference level for a UE, and/or other information. The interfering eNB may receive UL-RUMs from its neighboring UEs and/or the UE and may grant or dismiss each request for reduced interference based on the priority of the request, the buffer status of the interfering eNB, and/or other factors. If the request from the UE is granted, then the interfering eNB may adjust its transmit power and/or steer its transmission in order to reduce interference to the UE. The interfering eNB may determine a transmit power level $P_{DL\text{-}DATA}$ that it will use on the specified data resources.

The interfering eNB may then transmit a downlink resource quality indicator reference signal (DL-RQI-RS) at a power level of $P_{DL\text{-}RQI\text{-}RS}$, which may be equal to $P_{DL\text{-}DATA}$ or a scaled version of $P_{DL\text{-}DATA}$. An RQI reference signal may also be referred to as a power decision pilot, a power decision pilot indicator channel (PDPICH), etc. The interfering eNB may send the DL-RQI-RS on DL-RQI-RS resources, which may be paired with the specified data resources. For example, R sets of data resources may be available in subframe t, and R corresponding sets of DL-RQI-RS resources may be available in subframe t-x, where x may be a fixed offset. Each set of data resources may correspond to a set of resource blocks, and each set of DL-RQI-RS resources may correspond to a resource block. The interfering eNB may send the DL-RQI-RS on DL-RQI-RS resources r', which may correspond to specified data resources r. Similarly the serving eNB may receive UL-RUMs from its neighboring UEs and may send DL-RQI-RS in response to the UL-RUMs.

In one design, the eNBs may send their DL-RQI-RSs on DL-RQI-RS resources that may be common to all eNBs. The DL-RQI-RS resources may be some resources in the data region reserved by all eNBs for sending DL-RQI-RSs or may be defined in other manners. The DL-RQI-RS resources may include a sufficient number of resource elements to enable accurate SINR estimation. The DL-RQI-RSs may enable UEs to more accurately estimate the received signal quality of their serving eNBs on the specified data resources.

The UE may receive DL-RQI-RSs from the serving eNB as well as interfering eNBs on the DL-RQI-RS resources. The UE may estimate the SINR of the DL-RQI-RS resources for the serving eNB based on the received DL-RQI-RSs and may determine RQI based on the estimated SINR. The RQI may be indicative of received signal quality on the specified data resources and may be similar to a channel quality indicator (CQI). The RQI may indicate good received signal quality for the serving eNB on the specified data resources if strong interfering eNBs reduce interference on these data resources. The UE may send the RQI on the PUCCH to the serving eNB. The serving eNB may receive the RQI from the UE and may schedule the UE for data transmission on assigned data resources, which may include all or a subset of the specified data resources. The serving eNB may select a modulation and coding scheme (MCS) based on the RQI and may process data in accordance with the selected MCS. The serving eNB may generate a downlink (DL) grant, which may include the assigned data resources, the selected MCS, etc. The serving eNB may send the downlink grant on the PUCCH and data on the PUSCH to the UE. The UE may receive the downlink grant and data from the serving eNB and may decode the received data transmission based on the selected MCS. The UE may obtain ACK if the data is decoded correctly or NACK if the data is decoded in error and may send the ACK or NACK on the PUCCH to the serving eNB.

Figure 8:
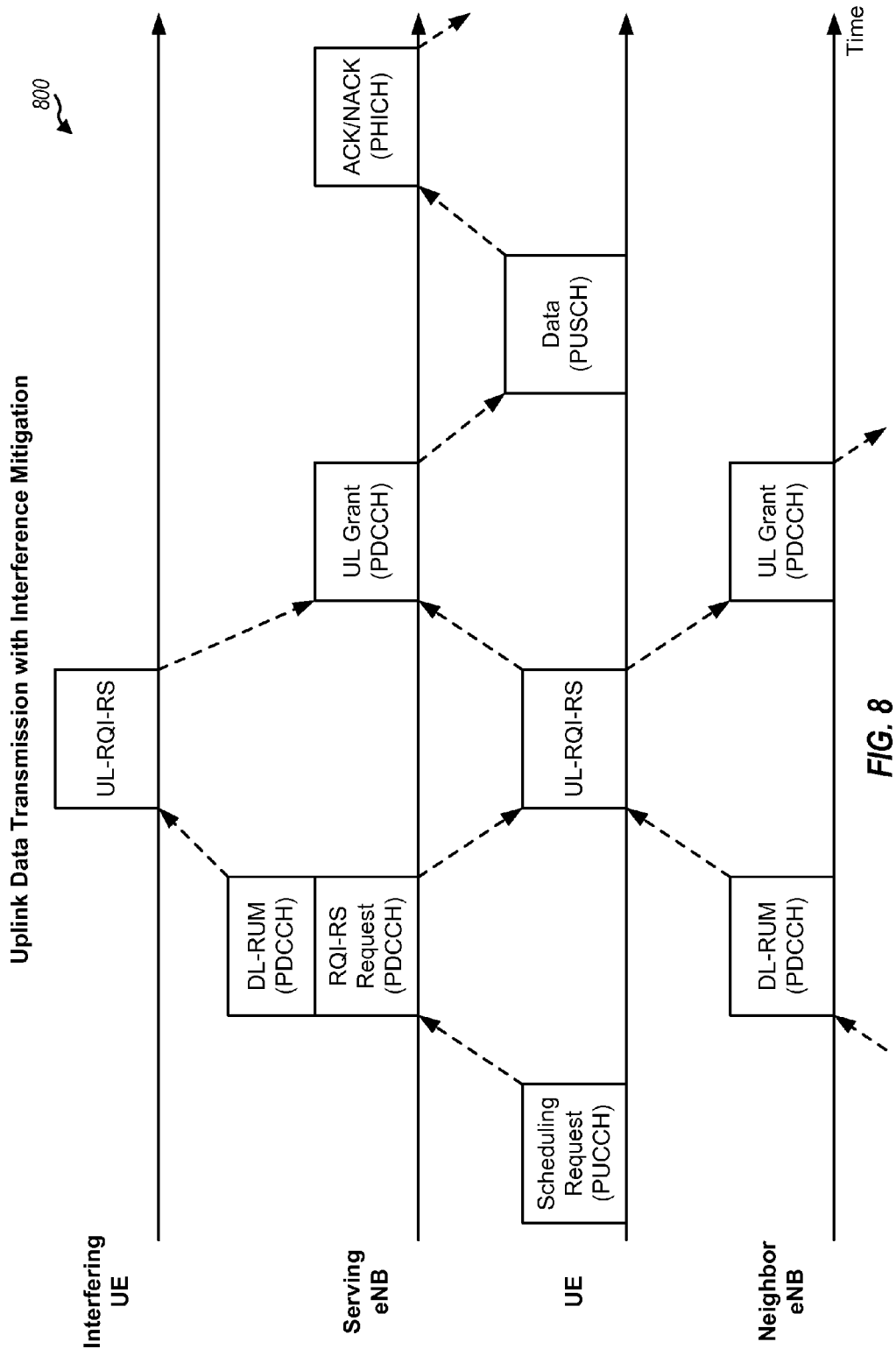

FIG. 8 shows a design of a scheme 800 for uplink data transmission with interference mitigation. A UE may have data to send to a serving eNB and may send a scheduling request on the PUCCH. The scheduling request may indicate the priority of the request, the amount of data to send by the UE, etc. The serving eNB may receive the scheduling request and may send an RQI-RS request on the PDCCH to ask the UE to send an uplink RQI reference signal (UL-RQI-RS). The serving eNB may also send a downlink RUM (DL-RUM) on the PDCCH to ask interfering UEs to reduce interference on specific data resources.

The UE may receive the RQI-RS request from the serving eNB and may also receive one or more DL-RUMs from one or more neighbor eNBs. The UE may determine a transmit power level $P_{UL\text{-}DATA}$ that it will or can use on the specified data resources based on the DL-RUMs from all neighbor eNBs. The UE may then transmit an UL-RQI-RS on UL-RQI-RS resources at a transmit power level of $P_{UL\text{-}RQI\text{-}RS}$, which may be equal to $P_{UL\text{-}DATA}$ or a scaled version of $P_{UL\text{-}DATA}$. In one design, the UE may send the UL-RQI-RS on UL-RQI-RS resources that may be common to all UEs.

The UL-RQI-RS resources may be certain resources in the data region reserved by all eNBs for UEs to send UL-RQI-RSs or may be defined in other manners.

The serving eNB may receive the UL-RQI-RSs from the UE as well as interfering UEs on the UL-RQI-RS resources and may estimate the SINR of the UE on these resources. The SINR may be good if the interfering UEs will clear the specified data resources. The serving eNB may then schedule the UE on the specified data resources and may select an MCS for the UE based on the estimated SINR. The serving eNB may generate an uplink grant, which may include the selected MCS, the assigned data resources, the transmit power level to use for the assigned data resources, etc. The serving eNB may send the uplink grant on the PDCCH to the UE. The UE may receive the uplink grant, process data based on the selected MCS, and send the data on the PUSCH on the assigned data resources. The serving eNB may receive and decode the data from the UE, determine ACK or NACK based on the decoding result, and send the ACK or NACK on the PHICH to the UE.

FIG. 7 shows an exemplary sequence of messages that may be used to support data transmission on the downlink with interference mitigation. FIG. 8 shows an exemplary sequence of messages that may be used to support data transmission on the uplink with interference mitigation. Interference mitigation on the downlink and/or uplink may also be supported with other sequences of messages to determine data resource usage between eNBs. For example, the eNBs may communicate via the backhaul in order to determine (i) specific downlink data resources and/or transmit power levels to be used by different eNBs for downlink interference mitigation and/or (ii) specific uplink data resources and/or transmit power levels to be used by different UEs for uplink interference mitigation.

FIGS. 7 and 8 assume that each eNB and each UE can send control information in appropriate subframes. For the schemes in FIGS. 7 and 8, the eNBs should be able to reliably send downlink control messages such as RUM triggers, DL-RUMs, RQI-RS requests, downlink grants, uplink grants, and ACK/NACK feedback on the downlink even in dominant interference scenarios. Furthermore, the UEs should be able to reliably send uplink control messages such as UL-RUMs, scheduling requests, RQIs, and ACK/NACK feedback on the uplink even in dominant interference scenarios. Reliable transmission of downlink control messages may be achieved with TDM partitioning of downlink control resources, as described above. Reliable transmission of uplink control messages may be achieved with FDM partitioning of uplink control resources, as also described above.

FIGS. 7 and 8 also show exemplary physical channels that may be used to send control messages on the downlink and uplink in LTE. In one design, an eNB may send downlink control messages such as RUM triggers, DL-RUMs, RQI-RS requests, downlink grants, and uplink grants on the PDCCH and may send ACK/NACK feedback on the PHICH. The eNB may also send multiple downlink control messages (e.g., DL-RUM and RQI-RS request) in the same control message. The eNB can reliably send these downlink control messages in the control region of subframes allocated to the eNB, which should have reduced (e.g., no) interference from interfering eNBs.

In one design, a UE may send uplink control messages such as UL-RUMs, scheduling requests, RQIs, and ACK/NACK feedback on the PUCCH (as shown in FIGS. 7 and 8) or with data on the PUSCH (not shown in FIGS. 7 and 8). The UE can reliably send these uplink control messages in the control region allocated to its serving eNB, which should be cleared of high interference from interfering UEs communicating with neighbor eNBs.

In yet another aspect, cross-subframe control may be used to support data transmission on the downlink and/or uplink with TDM partitioning of downlink control resources. Different eNBs may be allocated different subframes for sending control information with TDM partitioning. Each eNB may send control messages to support data transmission in the subframes allocated to that eNB. Different eNBs may have different timelines for sending control messages due to their different allocated subframes. With cross-subframe control, control information (e.g., grants, ACK/NACK, etc.) may be sent in a first subframe and may be applicable for data transmission in a second subframe, which may be a variable number of subframes from the first subframe.

Figure 9:
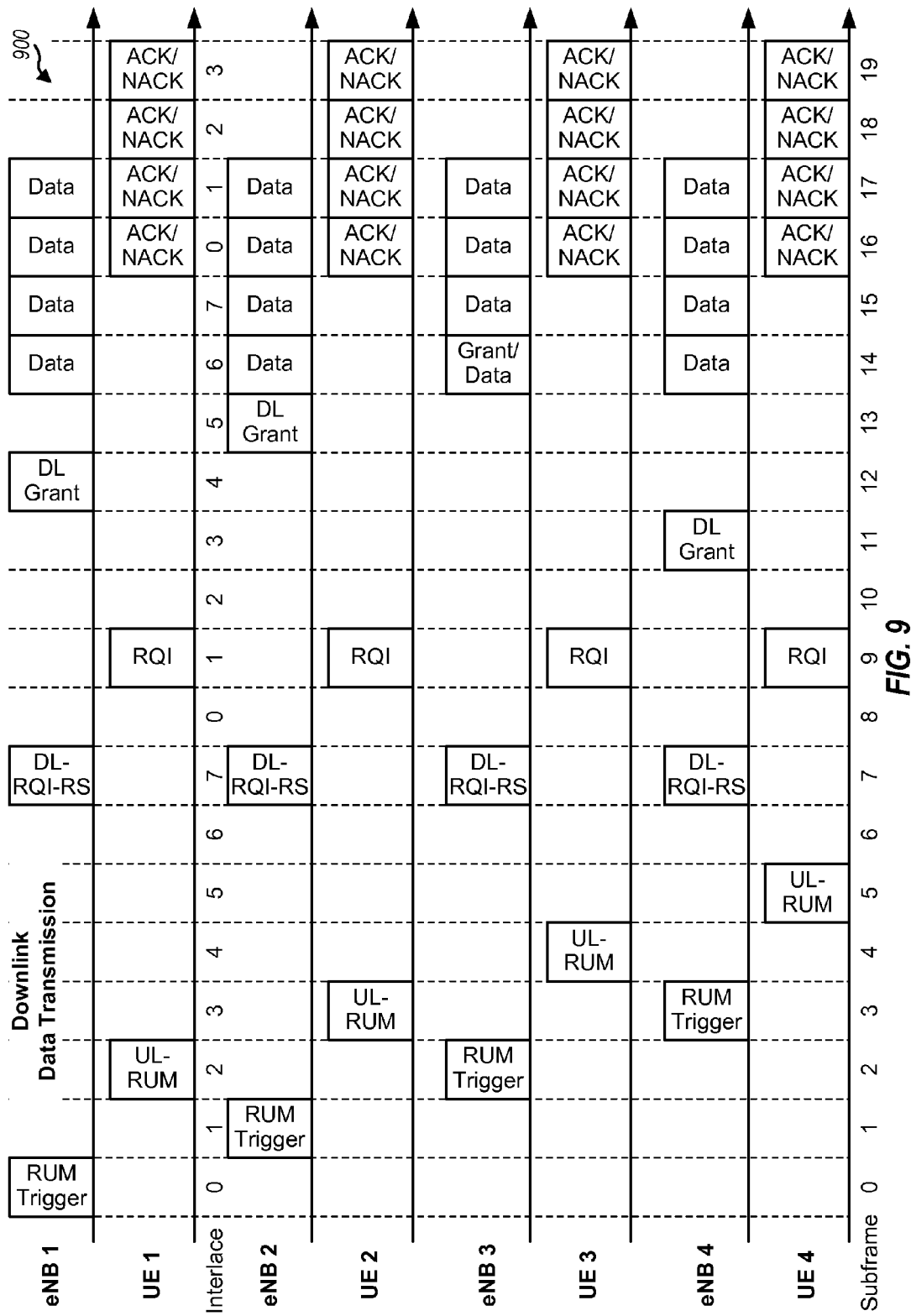
FIGS. 9 and 10 show data transmission with interference mitigation on the downlink and uplink, respectively, with time division multiplex (TDM) partitioning for the downlink.

FIG. 9 shows a design of a scheme 900 for downlink data transmission with interference mitigation when TDM partitioning is used for downlink control resources. In the example shown in FIG. 9, eight interlaces are defined, eNB 1 is allocated interlaces 0 and 4, eNB 2 is allocated interlaces 1 and 5, eNB 3 is allocated interlaces 2 and 6, and eNB 4 is allocated interlaces 3 and 7. Each eNB may send control information in the control region of the subframes in its allocated interlaces. Each eNB may send data in the data region of any subframe and may contend with other eNBs for downlink data resources. eNBs 1, 2, 3 and 4 serve UEs 1, 2, 3 and 4, respectively. FIG. 9 assumes a 1-subframe delay between reception of an incoming message and transmission of a corresponding outgoing message.

For data transmission on the downlink, eNBs 1, 2, 3 and 4 may send RUM triggers in the control region of subframes 0, 1, 2 and 3, respectively, in their allocated interlaces. UEs 1, 2, 3 and 4 may receive the RUM triggers from neighbor eNBs and may send UL-RUMs in subframes 2, 3, 4 and 5, respectively, to their serving eNBs. The UEs may also send the UL-RUMs in the same subframe, e.g., subframe 5. eNBs 1, 2, 3 and 4 may receive the UL-RUMs from the served UEs and may send DL-RQI-RSs on the same downlink resources in subframe 7. UEs 1, 2, 3 and 4 may receive the DL-RQI-RSs from the eNBs, estimate SINR, and send RQIs to their serving eNBs in subframe 9.

eNBs 1, 2, 3 and 4 may receive the RQIs from UEs 1, 2, 3 and 4, respectively, and may schedule the UEs for data transmission on the downlink. Due to the 1-subframe processing delay, eNBs 1, 2, 3 and 4 may send downlink grants to UEs 1, 2, 3 and 4 in subframes 12, 13, 14 and 11, respectively, of their allocated interlaces. eNBs 1, 2, 3 and 4 may send data to UEs 1, 2, 3 and 4, respectively, in subframes 14 through 17, which may be shared by the eNBs. UEs 1, 2, 3 and 4 may receive the data from their serving eNBs in subframes 14 through 17 and may send ACK/NACK feedback in subframes 16 through 19, respectively.

As shown in FIG. 9, the eNBs may send their control information in the subframes of their allocated interlaces in order to avoid high interference on the control information. One or more eNBs may send data in the same subframes and may adjust their transmit power and/or steer their transmissions to avoid high interference on the data. With cross-subframe control, a downlink grant may have a variable delay from a corresponding data transmission (instead of being transmitted in the same subframe as the corresponding data transmission, as shown in FIG. 7). This variable delay may result from different eNBs being allocated different subframes for sending control information. Furthermore, a given downlink grant may be applicable for data transmission in one or multiple subframes on the downlink. In the example shown in FIG. 9, each eNB may send control information in every fourth subframe, and a downlink grant may be applicable for data transmission in up to four subframes. In general, if an eNB can send control information in every S-th subframe, then a downlink grant may be applicable for data transmission in up to S subframes.

The eNBs may send RUM triggers in their allocated subframes. The eNBs may thereafter send DL-RQI-RSs on the same downlink resources to enable the UEs to estimate the SINRs that can be expected for subsequent data transmission on the downlink. There may be a variable delay between a RUM trigger from an eNB and a DL-RQI-RS from the eNB, which may be supported with cross-subframe control.

Figure 10:
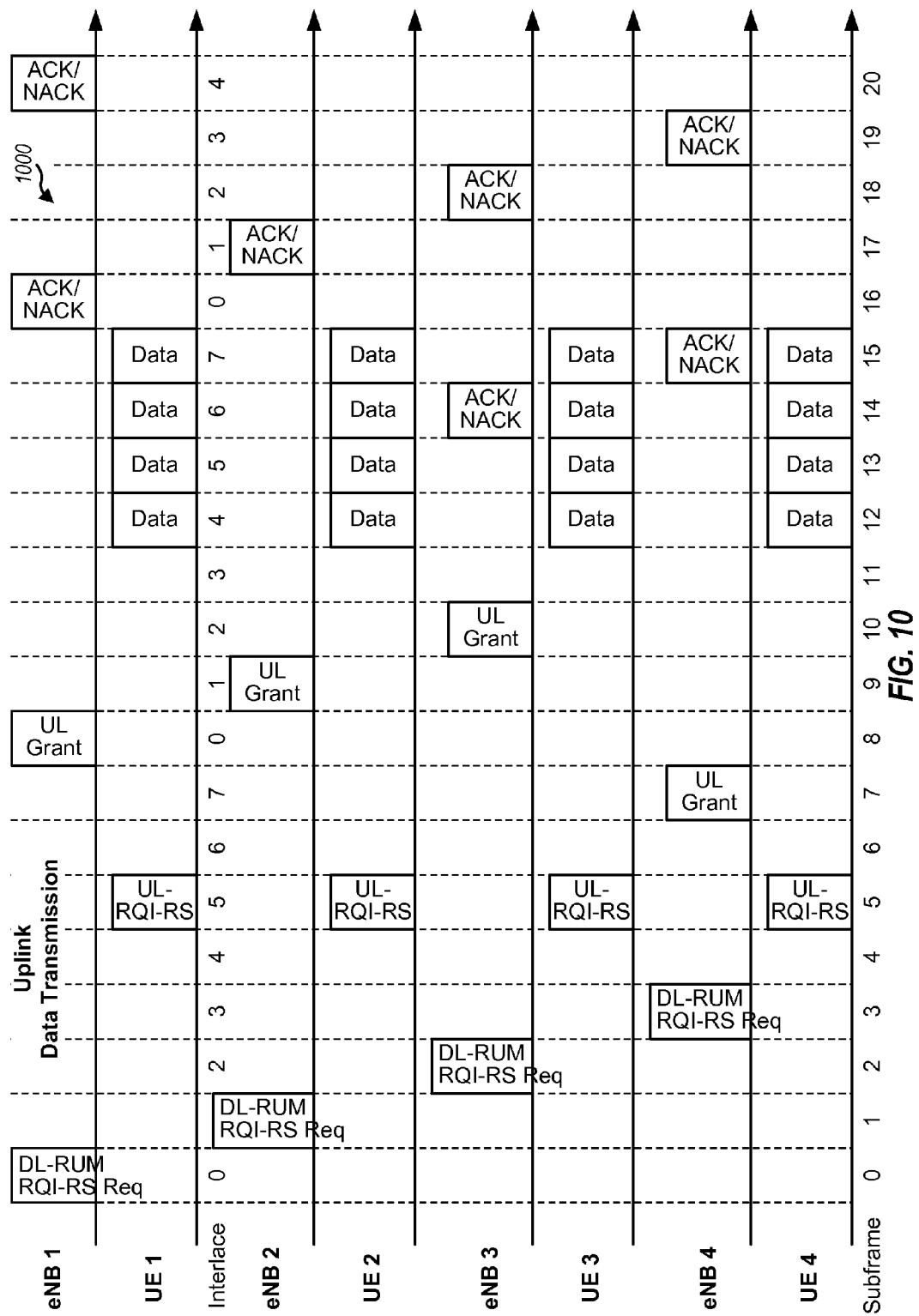

FIG. 10 shows a design of a scheme 1000 for uplink data transmission with interference mitigation when TDM partitioning is used for downlink control resources. The example in FIG. 10 assumes four eNBs 1, 2, 3 and 4 serving four UEs 1, 2, 3 and 4, respectively. Each eNB may be allocated two of the eight interlaces, as described above for FIG. 9.

For data transmission on the uplink, UEs 1, 2, 3 and 4 may send scheduling requests to serving eNBs 1, 2, 3 and 4, respectively (not shown in FIG. 10). eNBs 1, 2, 3 and 4 may send DL-RUMs to interfering UEs as well as RQI-RS requests to the served UEs in subframes 0, 1, 2 and 3, respectively, of their allocated interlaces. UEs 1, 2, 3 and 4 may receive the DL-RUMs from the neighbor eNBs and the RQI-RS requests from their serving eNBs. UEs 1, 2, 3 and 4 may send UL-RQI-RSs on the same uplink resources in subframe 5. eNBs 1, 2, 3 and 4 may receive the UL-RQI-RSs from the UEs, estimate SINR, and select MCSs for UEs 1, 2, 3 and 4, respectively. eNBs 1, 2, 3 and 4 may schedule the UEs for data transmission on the uplink and may send uplink grants to UEs 1, 2, 3 and 4 in subframes 8, 9, 10 and 7, respectively, of their allocated interlaces.

UEs 1, 2, 3 and 4 may send data to eNBs 1, 2, 3 and 4, respectively, in subframes 12 through 15. eNBs 1, 2, 3 and 4 may receive the data from their served UEs in subframes 12 through 15. Due to the 1-subframe processing delay, eNB 1 may send ACK/NACK in subframe 16 for data received in subframes 12, 13 and 14 from UE 1 and may send ACK/NACK in subframe 20 for data received in subframe 15. eNB 2 may send ACK/NACK in subframe 17 for data received in subframes 12 to 15 from UE 2. eNB 3 may send ACK/NACK in subframe 14 for data received in subframe 12 from UE 3 and may send ACK/NACK in subframe 18 for data received in subframes 13, 14 and 15. eNB 4 may send ACK/NACK in subframe 15 for data received in subframes 12 and 13 from UE 4 and may send ACK/NACK in subframe 19 for data received in subframes 14 and 15.

As shown in FIG. 10, the eNBs may send control information in the subframes of their allocated interlaces. One or more UEs may send data in the same subframes and may adjust their transmit power and/or steer their transmissions to avoid high interference on the data. With cross-subframe control, an uplink grant may have a variable delay from a corresponding data transmission. This variable delay may result from different eNBs being allocated different subframes for sending control information. Furthermore, a given uplink grant may be applicable for data transmission in one or multiple subframes on the uplink.

The UEs may send data transmission on the uplink in the same subframes. The eNBs may send ACK/NACK feedback in different subframes of their allocated interlaces. With cross-subframe control, ACK/NACK feedback may have a variable delay from a corresponding data transmission. Furthermore, ACK/NACK feedback may be sent in a given subframe for data transmission in a variable number of subframes.

The eNBs may send DL-RUMs and RQI-RS requests in different subframes of their allocated interlaces. The UEs may send UL-RQI-RSs on the same uplink resources to enable the eNBs to estimate the SINRs that can be expected for subsequent data transmission on the uplink. There may be a variable delay between the DL-RUM and RQI-RS request from an eNB and the UL-RQI-RS from a UE. The variable delay may be supported with cross-subframe control.

FIGS. 9 and 10 show exemplary timelines for a case in which four eNBs may cause high interference to one another, and each eNB may be allocated two interlaces for sending control information. An eNB may also be allocated fewer or more interlaces for sending control information. The eNB may then have a different timeline for sending various control messages. For downlink data transmission with interference mitigation, there may be a variable delay between a downlink grant and the corresponding data transmission on the downlink, as shown in FIG. 9. The eNB may send the downlink grant in any subframe allocated to the eNB and either prior to or with the data transmission. For uplink data transmission with interference mitigation, there may be a variable delay between an uplink grant and the corresponding data transmission on the uplink, as shown in FIG. 10. The eNB may send the uplink grant in any subframe allocated to the eNB prior to the data transmission. The eNB may also send ACK/NACK feedback in any subframe allocated to the eNB after the data transmission. The specific subframes used by the eNB to send downlink control messages and ACK/NACK feedback may be dependent on the interlaces allocated to the eNB.

For data transmission without cross-subframe control (e.g., as shown in FIGS. 7 and 8), there may be fixed delays between various transmissions. For data transmission with cross-subframe control (e.g., as shown in FIGS. 9 and 10), there may be variable delays between various transmissions. Table 1 lists subframes in which grant, data, and ACK/NACK may be sent for different data transmission scenarios. For the scenarios with cross-subframe control, offsets x and y may be variable and may be dependent on the subframes allocated to an eNB.

TABLE 1

| Scenario | DL/UL Grant | Data | ACK/NACK |
|---|---|---|---|
| Downlink Data Transmission Without Cross-Subframe Control in FIG. 7 | Subframe t | Subframe t | Subframe t + 4 |
| Uplink Data Transmission Without Cross-Subframe Control in FIG. 8 | Subframe t | Subframe t + 4 | Subframe t + 8 |
| Downlink Data Transmission With Cross-Subframe Control in FIG. 9 | Subframe t | Subframe t + x | Subframe t + x + y |
| Uplink Data Transmission With Cross-Subframe Control in FIG. 10 | Subframe t | Subframe t + x | Subframe t + x + y |

In the examples shown in FIGS. 9 and 10, each UE is scheduled for data transmission in four subframes. In general, a UE may be scheduled for data transmission in one or more subframes. In one design, a single downlink or uplink grant may be sent for data transmission in all scheduled subframes. In another design, one downlink or uplink grant may be sent for data transmission in each scheduled subframe. Downlink and uplink grants may also be sent in other manners.

Different eNBs may be allocated different subframes for sending control information with TDM partitioning, as described above. An eNB may avoid sending control information in the control region of the subframes allocated to other eNBs. However, the eNB may continue to send certain designated channels and/or signals in the control region and/or the data region of the subframes allocated to other eNBs. For example, the eNB may transmit the CRS in all subframes (i.e., in the subframes allocated to the eNB as well as the subframes allocated to other eNBs). The designated channels and/or signals may be used to support operation of legacy UEs, which may expect these channels and/or signals to be present and may not function properly in the absence of these channels and/or signals.

In yet another aspect, a UE may perform interference cancellation for one or more designated channels and/or signals in order to improve performance for control information and/or data. For interference cancellation, the UE may estimate interference due to a designated channel or signal, cancel the estimated interference, and then recover a desired channel or signal after canceling the estimated interference.

In one design, the UE may perform interference cancellation for the CRS, which may be transmitted by each eNB in the control and data regions of each subframe, e.g., as shown in FIG. 3. The CRS from an eNB may cause interference in one or more of the following ways:

CRS-on-CRS collision—multiple eNBs send their CRSs on the same resource elements, CRS-on-control collision—an eNB sends its CRS on resource elements used for control information by another eNB, and CRS-on-data collision—an eNB sends its CRS on resource elements used for data by another eNB.

The UE may perform interference cancellation for CRS-on-CRS collision, or CRS-on-control collision, or CRS-on-data collision, or a combination thereof. The UE may determine whether CRS-on-CRS collision has occurred between the CRS of its serving eNB and the CRS of an interfering eNB based on the cell IDs of the serving and interfering eNBs. The UE may perform interference cancellation for CRS-on-CRS collision, if it occurred, by estimating interference due to the CRS from the interfering eNB and canceling the estimated interference from a received signal at the UE to obtain an interference-canceled signal. The UE may then perform channel estimation based on the CRS from the serving eNB in the interference-canceled signal. The UE may be able to obtain a more accurate channel estimate for the serving eNB by canceling the interference due to the CRS from the interfering eNB.

The UE may perform interference cancellation for CRS-on-control collision by estimating interference due to the CRS from the interfering eNB, canceling the estimated interference, and processing the interference-canceled signal (instead of the received signal) to recover control information sent by the serving eNB. The UE may also decode the control information by taking into account the interference from the CRS of the interfering eNB. For example, the UE may perform decoding by giving (i) less weight to detected symbols from resource elements used by the interfering eNB to send the CRS and (ii) more weight to detected symbols from other resource elements. The UE may perform interference cancellation for CRS-on-data collision in similar manner as for CRS-on-control collision.

In another design, eNBs that may interfere with one another may be assigned cell IDs such that their CRSs are sent on different resource elements and hence do not collide. This may improve channel estimation performance for UEs. A UE may perform interference cancellation for CRS-on-control collision and/or CRS-on-data collision.

The wireless network may support operation on one or multiple carriers for the downlink and one or multiple carriers for the uplink. A carrier may refer to a range of frequencies used for communication and may be associated with certain characteristics. For example, a carrier may be associated with system information describing operation on the carrier, etc. A carrier may also be referred to as a channel, a frequency channel, etc. A carrier for the downlink may be referred to as a downlink carrier, and a carrier for the uplink may be referred to as an uplink carrier.

The techniques described herein may be used for multi-carrier operation. In one design, the techniques described herein may be performed for each downlink carrier and each uplink carrier. For example, an eNB may be allocated a set of subframes on each carrier for sending control information on the downlink. The eNB may be allocated staggered sets of subframes for different downlink carriers so that the eNB can send control information in as many subframes as possible. The eNB may also be allocated a frequency range on each uplink carrier for receiving control information on the uplink. The eNB may send RUM triggers, DL-RUMs, RQI-RS requests, grants, and/or other downlink control messages for each downlink carrier in the allocated subframes for that downlink carrier. The eNB may receive scheduling requests, UL-RUMs, and/or other uplink control messages for each uplink carrier in the allocated frequency range of that uplink carrier. A UE may monitor each downlink carrier on which the UE can receive control information and may detect for RUM triggers, DL-RUMs, RQI-RS requests, grants, and/or other downlink control messages. The UE may send scheduling requests, UL-RUMs, and/or other uplink control messages on each uplink carrier in the allocated frequency range for that uplink carrier.

In another design, an eNB may be allocated a set of subframes on a designated downlink carrier for sending control information for all downlink carriers. The eNB may also be allocated a frequency range on a designated uplink carrier for receiving control information for all uplink carriers. The eNB may send RUM triggers, DL-RUMs, RQI-RS requests, grants, and/or other downlink control messages for all downlink carriers in the allocated subframes on the designated downlink carrier. The eNB may receive scheduling requests, UL-RUMs, and/or other uplink control messages for all uplink carriers in the allocated frequency range of the designated uplink carrier. A UE may monitor the designated downlink carrier and may detect for RUM triggers, DL-RUMs, RQI-RS requests, grants, and/or other downlink control messages for all downlink carriers. The UE may send scheduling requests, UL-RUMs, and/or other uplink control messages for all uplink carriers in the allocated frequency range of the designated uplink carrier.

The techniques described herein can support communication in dominant interference scenarios. In a dominant interference scenario, a UE can reliably receive a transmission from a serving eNB on resources on which interfering eNBs do not transmit. The interfering eNBs may clear (or transmit at lower power level on) resources used to send control information as well as resources used to send data by the serving eNB. Resources for control information may be statically or semi-statically cleared with TDM partitioning for the downlink and with FDM partitioning for the uplink, as described above. Resources for data may be dynamically cleared with short-term interference mitigation, which may assume that control information can be reliably sent on the downlink and uplink.

FIG. 11 shows a design of a process 1100 for exchanging data in a wireless network. Process 1100 may be performed by a UE, a base station/eNB, or some other entity. Control information may be exchanged (e.g., sent or received) in a first subframe (block 1112). Data may be exchanged in a second subframe based on the control information exchanged in the first subframe (block 1114). The second subframe may be a variable number of subframes from the first subframe. ACK/NACK feedback may be exchanged in a third subframe for the data exchanged in the second subframe (block 1116). The third subframe may also be a variable number of subframes from the second subframe.

In one design, the first subframe may be allocated to a base station and may have reduced interference from at least one interfering base station. The second subframe may be available to the base station and the at least one interfering base station. In one design, a set of subframes may be allocated to the base station for sending control information. The base station may send control information in the set of subframes and may avoid sending control information in the remaining subframes. The first subframe may belong in the set of subframes. In another design, at least one interlace may be allocated to the base station for sending control information. Subframes in the at least one interlace may have reduced interference from the at least one interfering base station. The first subframe may belong in the at least one interlace allocated to the base station.

In one design, a base station (e.g., eNB 1 in FIG. 9) may perform process 1100 to transmit data on the downlink. The base station may send a downlink grant in the first subframe (e.g., subframe 12) in block 1112 and may send data in the second subframe (e.g., subframe 14) in block 1114. The base station may receive ACK/NACK feedback in a third subframe (e.g., subframe 16) in block 1116 for the data sent in the second subframe. The base station may send a message (e.g., a RUM trigger) in a fourth subframe (e.g., subframe 0) to request for reduced interference on the downlink in the second subframe. The fourth subframe may be a variable number of subframes from the second subframe. The base station may send a reference signal (e.g., a DL-RQI-RS) in a fifth subframe (e.g., subframe 7), which may be a variable number of subframes from the fourth subframe.

In another design, a UE (e.g., UE 1 in FIG. 9) may perform process 1100 to receive data on the downlink. The UE may receive a downlink grant in the first subframe (e.g., subframe 12) in block 1112 and may receive data in the second subframe (e.g., subframe 14) in block 1114. The UE may send ACK/NACK feedback in the third subframe (subframe 16) in block 1116 for the data received in the second subframe.

In yet another design, a base station (e.g., eNB 1 in FIG. 10) may perform process 1100 to receive data on the uplink. The base station may send an uplink grant in the first subframe (e.g., subframe 8) in block 1112 and may receive data in the second subframe (e.g., subframe 12) in block 1114. The base station may send ACK/NACK feedback in the third subframe (e.g., subframe 16) for the data received in the second subframe. The third subframe may be a variable number of subframes from the second subframe. The base station may send a message (e.g., a DL-RUM) in a fourth subframe (e.g., subframe 0) to request for reduced interference on the uplink in the second subframe. In one design, the fourth subframe may be a variable number of subframes from the second subframe, e.g., as shown in FIG. 10. In another design, the fourth subframe may be a fixed number of subframes from the second subframe. The base station may also send a message (e.g., a RQI-RS request) in the fourth subframe to request a UE to send a reference signal (e.g., a UL-RQI-RS) in a fifth subframe (e.g., subframe 5). The fourth subframe may be a variable number of subframes from the fifth subframe. The base station may receive a plurality of reference signals from a plurality of UEs including the UE in the fifth subframe. The base station may determine received signal quality for the UE based on the plurality of reference signals. The base station may select a modulation and coding scheme (MCS) for the UE based on the received signal quality for the UE and may send the uplink grant comprising the selected MCS.

In yet another design, a UE may perform process 1100 to send data on the uplink. The UE may receive an uplink grant in the first subframe (e.g., subframe 8) in block 1112 and may send data in the second subframe (e.g., subframe 12) in block 1114. The UE may receive ACK/NACK feedback in the third subframe (e.g., subframe 16) for the data sent in the second subframe.

In one design, operation on multiple carriers may be supported. In one design, a grant for data transmission on a plurality of carriers may be exchanged in block 1112. Data may be exchanged on the plurality of carriers indicated by the grant in block 1114.

FIG. 12 shows a design of an apparatus 1200 for exchanging data in a wireless network. Apparatus 1200 includes a module 1212 to exchange control information in a first subframe, a module 1214 to exchange data in a second subframe based on the control information exchanged in the first subframe, the second subframe being a variable number of subframes from the first subframe, and a module 1216 to exchange ACK/NACK feedback in a third subframe for the data exchanged in the second subframe, the third subframe being a variable number of subframes from the second subframe.

FIG. 13 shows a design of a process 1300 for exchanging data in a wireless network. Process 1300 may be performed by a UE, a base station/eNB, or some other entity. At least one grant for a UE may be exchanged (e.g., sent or received) (block 1312). Data may then be exchanged in a variable number of subframes indicated by the at least one grant (block 1314).

In one design of block 1312, the at least one grant may be exchanged in a subframe allocated to a base station and having reduced interference from at least one interfering base station. In one design, the base station may be allocated a set of subframes for sending control information among all available subframes. The base station may send grants to UEs observing high interference in the set of subframes and may avoid sending grants to these UEs in the remaining subframes. Each grant may cover data transmission in a single subframe or multiple subframes.

In one design, a base station may perform process 1300 to send data on the downlink to a UE, e.g., as shown in FIG. 9. The base station may send at least one downlink grant to the UE in block 1312 and may send data in the variable number of subframes to the UE in block 1314.

In another design, a UE may perform process 1300 to receive data on the downlink from a base station, e.g., as shown in FIG. 9. The UE may receive at least one downlink grant in block 1312 and may receive data in the variable number of subframes in block 1314.

In yet another design, a base station may perform process 1300 to receive data on the uplink from a UE, e.g., as shown in FIG. 10. The base station may send at least one uplink grant to the UE in block 1312 and may receive data in the variable number of subframes from the UE in block 1314.

In yet another design, a UE may perform process 1300 to send data on the downlink to a base station, e.g., as shown in FIG. 10. The UE may receive at least one uplink grant in block 1312 and may send data in the variable number of subframes in block 1314.

In one design, a plurality of grants may be sent to the UE in block 1312, one grant for data transmission in each of the variable number of subframes. The plurality of grants may be sent in a single subframe or in multiple subframes (e.g., one subframe for each subframe in which data is sent). In one design, each grant may comprise an indication of a subframe for which the grant applies. The indication may be explicitly given by a field in the grant or implicitly given by a resource on which the grant is sent, or a scrambling code used for the grant, etc. In another design, a single grant may be sent to the UE in block 1312 for data transmission in all of the variable number of subframes.

FIG. 14 shows a design of an apparatus 1400 for exchanging data in a wireless network. Apparatus 1400 includes a module 1412 to exchange at least one grant for a UE, and a module 1414 to exchange data in a variable number of subframes indicated by the at least one grant.

Figure 15:
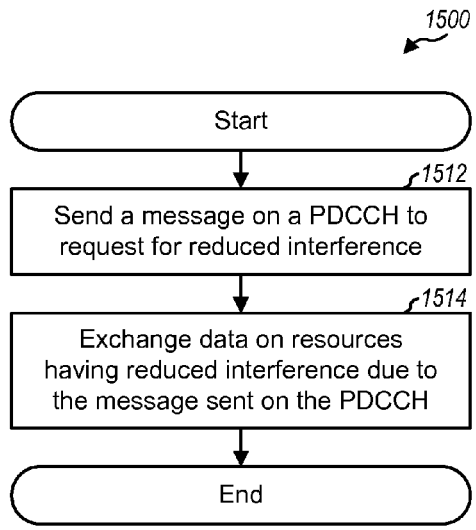
FIGS. 15 and 16 show a process and an apparatus, respectively, for sending messages for interference mitigation on the PDCCH.

FIG. 15 shows a design of a process 1500 for exchanging data in a wireless network. Process 1500 may be performed by a base station/eNB (as described below) or by some other entity. The base station may send a message on the PDCCH to request for reduced interference (block 1512). The base station may thereafter exchange (e.g., send or receive) data on resources having reduced interference due to the message sent on the PDCCH (block 1514).

In one design, the base station may perform process 1500 to send data on the downlink, e.g., as shown in FIG. 7. For block 1512, the base station may send the message (e.g., a RUM trigger) on the PDCCH to request for reduced interference from at least one interfering base station. For block 1514, the base station may send data to a UE on the resources having reduced interference from the at least one interfering base station due to the message sent on the PDCCH. The base station may send a downlink grant on the PDCCH to the UE and may send data to the UE based on the downlink grant.

In another design, the base station may perform process 1500 to receive data on the uplink, e.g., as shown in FIG. 8. For block 1512, the base station may send the message (e.g., a DL-RUM) on the PDCCH to request for reduced interference from at least one interfering UE communicating with at least one neighbor base station. For block 1514, the base station may receive data from a UE on the resources having reduced interference from the at least one interfering UE due to the message sent on the PDCCH. In one design, the base station may send a second message (e.g., an RQI-RS request) on the PDCCH to request the UE to send a reference signal (e.g., an UL-RQI-RS). The base station may receive a plurality of reference signals from a plurality of UEs including the UE and may estimate received signal quality for the UE based on these reference signals. The base station may determine a modulation and coding scheme (MCS) based on the estimated received signal quality for the UE. The base station may generate an uplink grant comprising the selected MCS, send an uplink grant on the PDCCH to the UE, and receive data sent by the UE based on the uplink grant.

In one design, multi-carrier operation may be supported. In one design, the base station may send messages on the PDCCH on each of a plurality of carriers. Each message may request for reduced interference on a carrier on which the message is sent. In another design, the base station may send messages on the PDCCH on a designated carrier among the plurality of carriers. Each message may request for reduced interference on one or more of the plurality of carriers.

Figure 16:
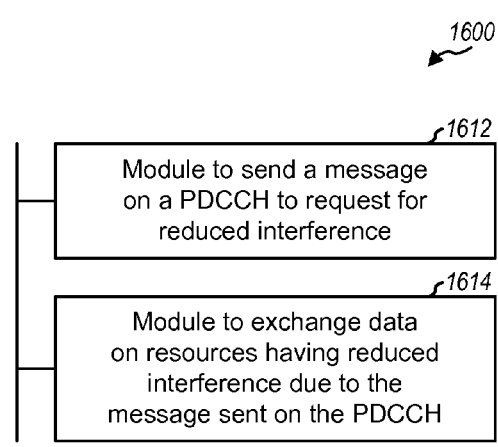

FIG. 16 shows a design of an apparatus 1600 for exchanging data in a wireless network. Apparatus 1600 includes a module 1612 to send a message on a PDCCH to request for reduced interference, and a module 1614 to exchange data on resources having reduced interference due to the message sent on the PDCCH.

Figure 17:
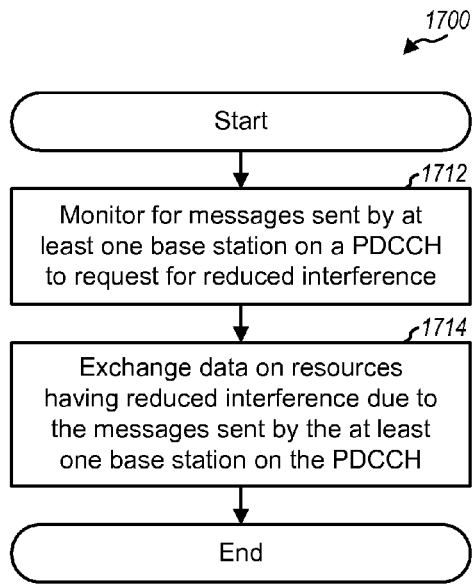
FIGS. 17 and 18 show a process and an apparatus, respectively, for receiving messages for interference mitigation sent on the PDCCH.

FIG. 17 shows a design of a process 1700 for exchanging data in a wireless network. Process 1700 may be performed by a UE (as described below) or by some other entity. The UE may monitor for messages sent by at least one base station on the PDCCH to request for reduced interference (block 1712). The UE may exchange (e.g., send or receive) data on resources having reduced interference due to the messages sent by the at least one base station on the PDCCH (block 1714).

In one design, the UE may perform process 1700 to receive data on the downlink, e.g., as shown in FIG. 7. The UE may receive data from a serving base station on the resources having reduced interference from at least one neighbor base station. In one design, the UE may receive a first message (e.g., a RUM trigger) sent by a neighbor base station on the PDCCH to request for reduced interference. The UE may send a second message (e.g., an UL-RUM) to the serving base station to forward the request for reduced interference from the neighbor base station. In another design, the UE may receive the first message sent by the serving base station on the PDCCH to request for reduced interference. The UE may send the second message to the at least one neighbor base station to forward the request for reduced interference from the serving base station. In one design, the UE may receive a plurality of reference signals (e.g., DL-RQI-RSs) from a plurality of base stations including the serving base station and at least one neighbor base station. The UE may estimate received signal quality for the serving base station based on the reference signals. The UE may send RQI indicative of the received signal quality for the serving base station.

In another design, the UE may perform process 1700 to send data on the uplink, e.g., as shown in FIG. 8. The UE may send data to the serving base station on the resources having reduced interference from at least one interfering UE communicating with at least one neighbor base station. In one design, the UE may receive at least one message (e.g., DL-RUM) sent by at least one neighbor base station on the PDCCH to request for reduced interference. The UE may determine whether or not to send data on the resources based on the at least one message received from the at least one neighbor base station. The UE may receive a message (e.g., a RQI-RS request) sent by the serving base station on the PDCCH to request for transmission of a reference signal. The UE may determine a first transmit power level for the resources in response to the at least one message from the at least one neighbor base station and the message from the serving base station. The UE may then transmit a reference signal (e.g., an UL-RQI-RS) at a second transmit power level determined based on the first transmit power level.

In one design, multi-carrier operation may be supported. In one design, the UE may monitor for messages from the at least one base station on each of a plurality of carriers. In another design, the UE may monitor for messages from the at least one base station on a designated carrier among the plurality of carriers.

Figure 18:
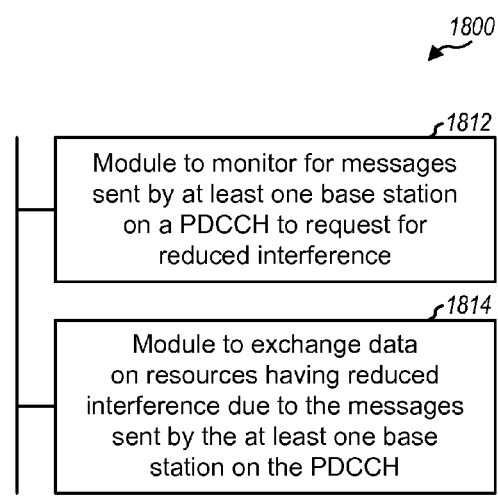

FIG. 18 shows a design of an apparatus 1800 for exchanging data in a wireless network. Apparatus 1800 includes a module 1812 to monitor for messages sent by at least one base station on a PDCCH to request for reduced interference, and a module 1814 to exchange data on resources having reduced interference due to the messages sent by the at least one base station on the PDCCH.

The modules in FIGS. 12, 14, 16 and 18 may comprise processors, electronic devices, hardware devices, electronic components, logical circuits, memories, software codes, firmware codes, etc., or any combination thereof.

Figure 19:
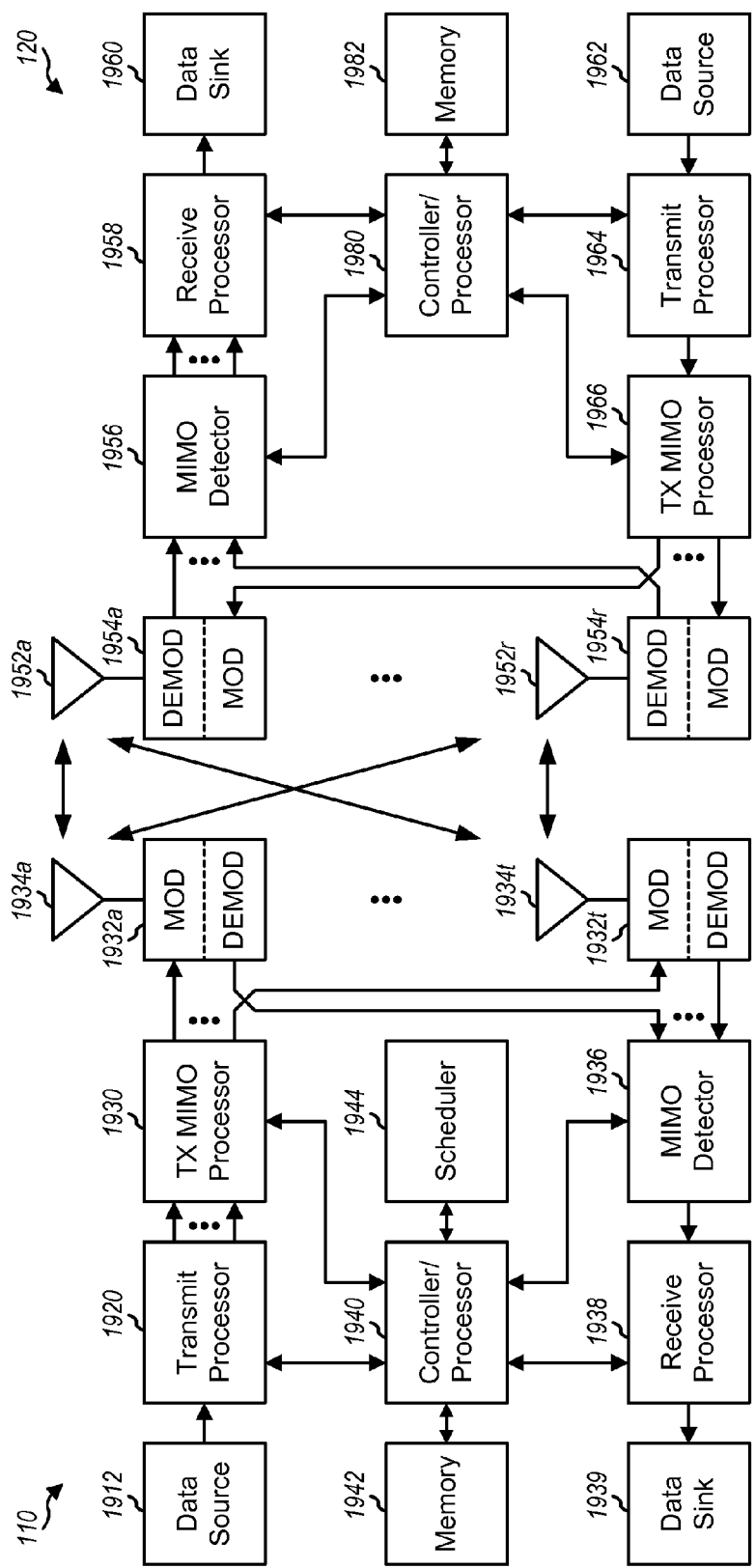
FIG. 19 shows a block diagram of a base station and a UE.

FIG. 19 shows a block diagram of a design of a base station/eNB 110 and a UE 120, which may be one of the base stations/eNBs and one of the UEs in FIG. 1. Base station 110 may be equipped with T antennas 1934a through 1934t, and UE 120 may be equipped with R antennas 1952a through 1952r, where in general T≥1 and R≥1.

At base station 110, a transmit processor 1920 may receive data from a data source 1912 and control information from a controller/processor 1940. The control information may comprise control messages such as RUM triggers, DL-RUMs, RQI-RS requests, downlink grants, uplink grants, etc. Processor 1920 may process (e.g., encode and modulate) the data and control information to obtain data symbols and control symbols, respectively. Processor 1920 may also generate reference symbols, e.g., for the CRS, DL-RQI-RS, etc. A transmit (TX) multiple-input multiple-output (MIMO) processor 1930 may perform spatial processing (e.g., precoding) on the data symbols, the control symbols, and/or the reference symbols, if applicable, and may provide T output symbol streams to T modulators (MODs) 1932a through 1932t. Each modulator 1932 may process a respective output symbol stream (e.g., for OFDM, etc.) to obtain an output sample stream. Each modulator 1932 may further process (e.g., convert to analog, amplify, filter, and upconvert) the output sample stream to obtain a downlink signal. T downlink signals from modulators 1932a through 1932t may be transmitted via T antennas 1934a through 1934t, respectively.

At UE 120, antennas 1952a through 1952r may receive the downlink signals from base station 110 and other base stations and may provide received signals to demodulators (DEMODs) 1954a through 1954r, respectively. Each demodulator 1954 may condition (e.g., filter, amplify, downconvert, and digitize) a respective received signal to obtain input samples. Each demodulator 1954 may further process the input samples (e.g., for OFDM, etc.) to obtain received symbols. A MIMO detector 1956 may obtain received symbols from all R demodulators 1954a through 1954r, perform MIMO detection on the received symbols if applicable, and provide detected symbols. A receive processor 1958 may process (e.g., demodulate and decode) the detected symbols, provide decoded data for UE 120 to a data sink 1960, and provide decoded control information to a controller/processor 1980.

On the uplink, at UE 120, a transmit processor 1964 may receive data from a data source 1962 and control information from controller/processor 1980. The control information may comprise control messages such as scheduling requests, UL-RUMs, RQIs, etc. Processor 1964 may process (e.g., encode and modulate) the data and control information to obtain data symbols and control symbols, respectively. Processor 1964 may also generate reference symbols, e.g., for UL-RQI-RS. The symbols from transmit processor 1964 may be precoded by a TX MIMO processor 1966 if applicable, further processed by modulators 1954a through 1954r (e.g., for SC-FDM, OFDM, etc.), and transmitted to base station 110 and possibly other base stations. At base station 110, the uplink signals from UE 120 and other UEs may be received by antennas 1934, processed by demodulators 1932, detected by a MIMO detector 1936 if applicable, and further processed by a receive processor 1938 to obtain decoded data and control information sent by UE 120 and other UEs. Processor 1938 may provide the decoded data to a data sink 1939 and the decoded control information to controller/processor 1940.

Controllers/processors 1940 and 1980 may direct the operation at base station 110 and UE 120, respectively. Processor 1940 and/or other processors and modules at base station 110 may perform or direct process 1100 in FIG. 11, process 1300 in FIG. 13, process 1500 in FIG. 15, and/or other processes for the techniques described herein. Processor 1980 and/or other processors and modules at UE 120 may perform or direct process 1100 in FIG. 11, process 1300 in FIG. 13, process 1700 in FIG. 17, and/or other processes for the techniques described herein. Memories 1942 and 1982 may store data and program codes for base station 110 and UE 120, respectively. A scheduler 1944 may schedule UEs for data transmission on the downlink and/or uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
  exchanging control information in a first subframe, wherein the control information identifies a second subframe as being a variable number of subframes from the first subframe;
  exchanging data in the second subframe based on the control information exchanged in the first subframe, the second subframe being the variable number of subframes from the first subframe; and
  exchanging acknowledgement/negative acknowledgement (ACK/NACK) feedback in a third subframe for the data exchanged in the second subframe, the third subframe being another variable number of subframes from the second subframe, wherein the another variable number of subframes is dependent on an allocation of subframes to a base station.

2. The method of claim 1, wherein the first subframe is allocated to the base station and has reduced interference from at least one interfering base station, and wherein the second subframe is available to the base station and the at least one interfering base station.

3. The method of claim 1, further comprising:
  determining a set of subframes allocated to the base station for sending control information and having reduced interference from at least one interfering base station, wherein the first subframe is in the set of subframes.

4. The method of claim 1, further comprising:
  determining at least one interlace structure allocated to the base station for sending control information, wherein subframes in the at least one interlace structure have reduced interference from at least one interfering base station, and wherein the first subframe belongs in the at least one interlace allocated to the base station.

5. The method of claim 1, wherein the exchanging control information comprises sending a downlink grant in the first subframe, and wherein the exchanging data comprises sending data in the second subframe.

6. The method of claim 1, wherein the exchanging control information comprises receiving a downlink grant in the first subframe, and wherein the exchanging data comprises receiving data in the second subframe.

7. The method of claim 1, wherein the exchanging control information comprises sending an uplink grant in the first subframe, and wherein the exchanging data comprises receiving data in the second subframe.

8. The method of claim 1, wherein the exchanging control information comprises receiving an uplink grant in the first subframe, and wherein the exchanging data comprises sending data in the second subframe.

9. The method of claim 1, further comprising:
  sending a message in a fourth subframe to request for reduced interference on a downlink in the second subframe, the fourth subframe being a variable number of subframes from the second subframe.

10. The method of claim 9, further comprising:
  sending a reference signal in a fifth subframe that is a variable number of subframes from the fourth subframe.

11. The method of claim 1, further comprising:
  sending a message in a fourth subframe to request for reduced interference on an uplink in the second subframe, the fourth subframe being a variable number of subframes from the second subframe.

12. The method of claim 1, further comprising:
  sending a message in a fourth subframe to request a user equipment (UE) to send a reference signal in a fifth subframe, the fourth subframe being a variable number of subframes from the fifth subframe.

13. The method of claim 12, further comprising:
  receiving a plurality of reference signals from a plurality of user equipments (UEs) including the UE in the fifth subframe; and
  determining received signal quality for the UE based on the plurality of reference signals.

14. The method of claim 1, wherein the exchanging control information comprises exchanging a grant for data transmission on a plurality of carriers, and wherein the exchanging data comprises exchanging data on the plurality of carriers indicated by the grant.

15. An apparatus for wireless communication, comprising:
means for exchanging control information in a first subframe, wherein the control information identifies a second subframe as being a variable number of subframes from the first subframe;
means for exchanging data in the second subframe based on the control information exchanged in the first subframe, the second subframe being the variable number of subframes from the first subframe; and
means for exchanging acknowledgement/negative acknowledgement (ACK/NACK) feedback in a third subframe for the data exchanged in the second subframe, the third subframe being another variable number of subframes from the second subframe, wherein the another variable number of subframes is dependent on an allocation of subframes to a base station.

16. The apparatus of claim 15, further comprising:
means for sending a message in a fourth subframe to request for reduced interference on a downlink in the second subframe, the third subframe being a variable number of subframes from the second subframe.

17. The apparatus of claim 16, further comprising:
means for sending a reference signal in a fifth subframe that is a variable number of subframes from the fourth subframe.

18. The apparatus of claim 15, further comprising:
means for sending a message in a fourth subframe to request for reduced interference on an uplink in the second subframe, the fourth subframe being a variable number of subframes from the second subframe.

19. An apparatus for wireless communication, comprising:
at least one processor configured to exchange control information in a first subframe, wherein the control information identifies a second subframe as being a variable number of subframes from the first subframe, to exchange data in the second subframe based on the control information exchanged in the first subframe, the second subframe being the variable number of subframes from the first subframe, and to exchange acknowledgement/negative acknowledgement (ACK/NACK) feedback in a third subframe for the data exchanged in the second subframe, the third subframe being another variable number of subframes from the second subframe, wherein the another variable number of subframes is dependent on an allocation of subframes to a base station.

20. The apparatus of claim 19, wherein the at least one processor is configured to send a message in a fourth subframe to request for reduced interference on a downlink in the second subframe, the fourth subframe being a variable number of subframes from the second subframe.

21. The apparatus of claim 20, wherein the at least one processor is configured to send a reference signal in a fifth subframe that is a variable number of subframes from the fourth subframe.

22. The apparatus of claim 19, wherein the at least one processor is configured to send a message in a fourth subframe to request for reduced interference on an uplink in the second subframe, the fourth subframe being a variable number of subframes from the second subframe.

23. A computer program product, comprising:
a non-transitory computer-readable medium comprising:
code for causing at least one computer to exchange control information in a first subframe, wherein the control information identifies a second subframe as being a variable number of subframes from the first subframe,
code for causing the at least one computer to exchange data in the second subframe based on the control information exchanged in the first subframe, the second subframe being the variable number of subframes from the first subframe, and
code for exchanging acknowledgement/negative acknowledgement (ACK/NACK) feedback in a third subframe for the data exchanged in the second subframe, the third subframe being another variable number of subframes from the second subframe, wherein the another variable number of subframes is dependent on an allocation of subframes to a base station.

24. A method for wireless communication, comprising:
exchanging at least one grant for a user equipment (UE), wherein the at least one grant identifies a second subframe as being a variable number of subframes from a first subframe in which the grant is exchanged; and
exchanging data in the second subframe based on the grant exchanged in the first subframe, the second subframe being the variable number of subframes from the first subframe as indicated by the at least one grant,
wherein each grant comprises an indication of a subframe for which the grant applies, the indication being given implicitly by at least one of a resource on which the grant is sent or a scrambling code used for the grant.

25. The method of claim 24, wherein the first subframe is a subframe allocated to a base station and having reduced interference from at least one interfering base station.

26. The method of claim 25, wherein the base station is allocated a set of subframes for sending control information among all available subframes, and wherein the base station sends grants to UEs observing high interference in the set of subframes and does not send grants to the UEs observing high interference in remaining subframes.

27. The method of claim 24, wherein the exchanging at least one grant comprises sending at least one downlink grant to the UE, and wherein the exchanging data comprises sending data in the variable number of subframes to the UE.

28. The method of claim 24, wherein the exchanging at least one grant comprises receiving at least one downlink grant at the UE, and wherein the exchanging data comprises receiving data in the variable number of subframes at the UE.

29. The method of claim 24, wherein the exchanging at least one grant comprises sending at least one uplink grant to the UE, and wherein the exchanging data comprises receiving data in the variable number of subframes from the UE.

30. The method of claim 24, wherein the exchanging at least one grant comprises receiving at least one uplink grant at the UE, and wherein the exchanging data comprises sending data in the variable number of subframes from the UE.

31. The method of claim 24, wherein the exchanging at least one grant comprises sending a plurality of grants to the UE, one grant for data transmission in each of the variable number of subframes.

32. The method of claim 31, wherein the plurality of grants are sent in a single subframe.

33. The method of claim 24, wherein the exchanging at least one grant comprises sending a single grant for data transmission to occur in all of the variable number of subframes.

34. An apparatus for wireless communication, comprising:
   means for exchanging at least one grant for a user equipment (UE), wherein the at least one grant identifies a second subframe as being a variable number of subframes from a first subframe in which the grant is exchanged; and
   means for exchanging data in the second subframe based on the grant exchanged in the first subframe, the second subframe being the variable number of subframes from the first subframe as indicated by the at least one grant,
   wherein each grant comprises an indication of a subframe for which the grant applies, the indication being given implicitly by at least one of a resource on which the grant is sent or a scrambling code used for the grant.

35. The apparatus of claim 34, wherein the means for exchanging at least one grant comprises means for receiving at least one downlink grant at the UE, and wherein the means for exchanging data comprises means for receiving data in the variable number of subframes at the UE.

36. The apparatus of claim 34, wherein the means for exchanging at least one grant comprises means for receiving at least one uplink grant at the UE, and wherein the means for exchanging data comprises means for sending data in the variable number of subframes from the UE.

37. The apparatus of claim 34, wherein the means for exchanging at least one grant comprises means for sending a plurality of grants to the UE, one grant for data transmission in each of the variable number of subframes.

38. The apparatus of claim 34, wherein the means for exchanging at least one grant comprises means for sending a single grant for data transmission to occur in all of the variable number of subframes.

39. An apparatus for wireless communication, comprising:
   at least one processor configured to exchange at least one grant for a user equipment (UE), wherein the at least one grant identifies a second subframe as being a variable number of subframes from a first subframe in which the grant is exchanged, and to exchange data in the second subframe based on the grant exchanged in the first subframe, the second subframe being the variable number of subframes from the first subframe as indicated by the at least one grant,
   wherein each grant comprises an indication of a subframe for which the grant applies, the indication being given implicitly by at least one of a resource on which the grant is sent or a scrambling code used for the grant.

40. A computer program product, comprising:
   a non-transitory computer-readable medium comprising:
   code for causing at least one computer to exchange at least one grant for a user equipment (UE), wherein the at least one grant identifies a second subframe as being a variable number of subframes from a first subframe in which the grant is exchanged, and
   code for causing the at least one computer to exchange data in the second subframe based on the grant exchanged in the first subframe, the second subframe being the variable number of subframes from the first subframe as indicated by the at least one grant,
   wherein each grant comprises an indication of a subframe for which the grant applies, the indication being given implicitly by at least one of a resource on which the grant is sent or a scrambling code used for the grant.

* * * * *